(12) United States Patent
Oguchi et al.

(10) Patent No.: US 7,606,260 B2
(45) Date of Patent: Oct. 20, 2009

(54) VIRTUAL PATH CONFIGURATION APPARATUS, VIRTUAL PATH CONFIGURATION METHOD, AND COMPUTER PRODUCT

(75) Inventors: Naoki Oguchi, Kawasaki (JP); Tetsumei Tsuruoka, Kawasaki (JP); Makoto Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 887 days.

(21) Appl. No.: 10/779,754

(22) Filed: Feb. 17, 2004

(65) Prior Publication Data
US 2004/0190532 A1 Sep. 30, 2004

(30) Foreign Application Priority Data
Mar. 31, 2003 (JP) ............................... 2003-096280

(51) Int. Cl.
*H04J 3/22* (2006.01)
(52) U.S. Cl. ................... 370/465; 370/235; 370/236; 370/410; 370/426; 370/395.31
(58) Field of Classification Search ......... 370/353–354, 370/389, 392, 395.1, 401, 410, 422, 426, 370/466, 467, 473, 474, 235, 236, 464, 465, 370/395.31
See application file for complete search history.

(56) References Cited

U.S. PATENT DOCUMENTS

| 5,243,592 | A | | 9/1993 | Perlman et al. |
| 6,047,325 | A | * | 4/2000 | Jain et al. .................. 709/227 |
| 6,081,524 | A | * | 6/2000 | Chase et al. ................ 370/389 |
| 6,493,349 | B1 | | 12/2002 | Casey |
| 6,594,704 | B1 | * | 7/2003 | Birenback et al. ........... 709/238 |
| 6,778,498 | B2 | * | 8/2004 | McDysan ................... 370/231 |
| 6,813,644 | B1 | * | 11/2004 | Jamieson et al. ............ 709/242 |
| 6,967,954 | B2 | * | 11/2005 | Sugiyama ............... 370/395.52 |
| 7,257,119 | B2 | * | 8/2007 | Uttaro .................... 370/395.1 |
| 7,274,704 | B1 | * | 9/2007 | Ould-Brahim et al. ...... 370/409 |
| 7,433,320 | B2 | * | 10/2008 | Previdi et al. ............... 370/248 |
| 7,463,627 | B1 | * | 12/2008 | Chase et al. ................ 370/389 |
| 2003/0053450 | A1 | | 3/2003 | Kubota et al. |

FOREIGN PATENT DOCUMENTS

| JP | 2001-326692 | 11/2001 |
| JP | 2002-176436 | 6/2002 |
| JP | 2003-092586 | 3/2003 |
| JP | 2003-188906 | 7/2003 |
| JP | 2004-64663 | 2/2004 |

OTHER PUBLICATIONS

Chinese Office Action dated Apr. 21, 2006, with translation.
Notice of Rejection mailed Aug. 21, 2007, with partial translation, from the corresponding Japanese Application.

* cited by examiner

*Primary Examiner*—Michael J Moore, Jr.
*Assistant Examiner*—Mark A Mais
(74) *Attorney, Agent, or Firm*—Katten Muchin Rosenman LLP

(57) ABSTRACT

Configuration information set in one virtual path configuration apparatus is shared with all the virtual path configuration apparatuses in the virtual private network. The configuration information may be shared by transmitting the configuration information to other virtual path configuration apparatuses or receiving configuration information from the other virtual path configuration apparatuses.

18 Claims, 33 Drawing Sheets

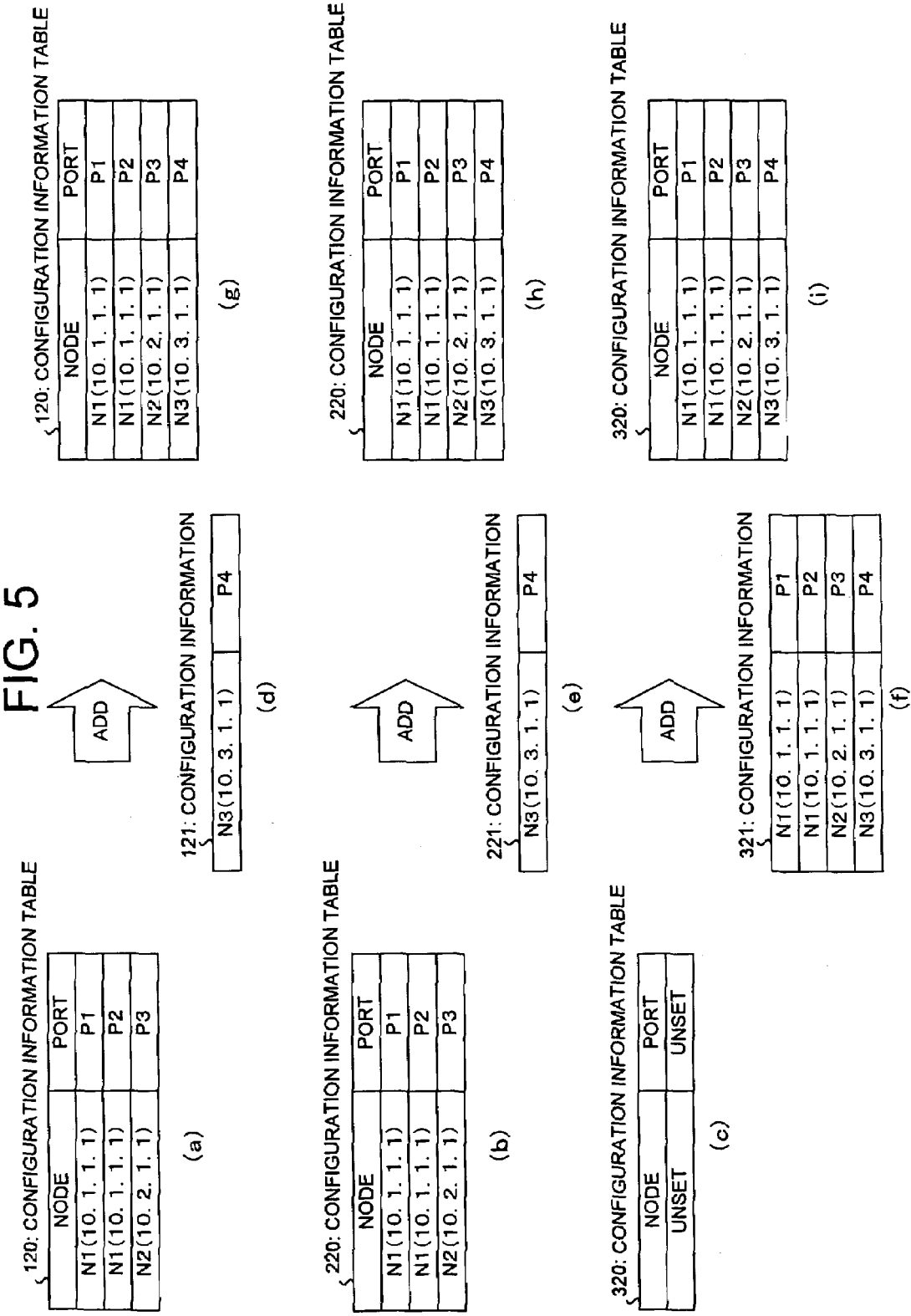

FIG. 6

132: CONFIGURATION INFORMATION SYNCHRONIZATION TABLE

| NODE | PORT | ADDITION/DELETION FLAG | SYNCHRONIZATION FLAG |
|---|---|---|---|
| N1(10.1.1.1) | P1 | 1 | 0 |
| N1(10.1.1.1) | P2 | 1 | 0 |
| N2(10.2.1.1) | P3 | 1 | 0 |

1: ADD　　1: SYNCHRONIZED
0: DELETE　0: ASYNCHRONOUS

1341: NODE SYNCHRONIZATION TABLE (CORRESPONDING TO NODE N2)

| NODE | PORT | ADDITION/DELETION FLAG | SYNCHRONIZATION FLAG |
|---|---|---|---|
| N1(10.1.1.1) | P1 | 1 | 0 |
| N1(10.1.1.1) | P2 | 1 | 0 |
| N2(10.2.1.1) | P3 | UNSET | UNSET |

1342: NODE SYNCHRONIZATION TABLE (CORRESPONDING TO NODE N3)

| NODE | PORT | ADDITION/DELETION FLAG | SYNCHRONIZATION FLAG |
|---|---|---|---|
| UNSET | UNSET | UNSET | UNSET |

FIG. 7

132: CONFIGURATION INFORMATION SYNCHRONIZATION TABLE

| NODE | PORT | ADDITION/DELETION FLAG | SYNCHRONIZATION FLAG |
|---|---|---|---|
| N1(10.1.1.1) | P1 | 1 | 1 |
| N1(10.1.1.1) | P2 | 1 | 1 |
| N2(10.2.1.1) | P3 | 1 | 1 |
| N3(10.3.1.1) | P4 | 1 | 0 |

1: ADD    1: SYNCHRONIZED
0: DELETE    0: ASYNCHRONOUS

ADD

1341: NODE SYNCHRONIZATION TABLE (CORRESPONDING TO NODE N2)

| NODE | PORT | ADDITION/DELETION FLAG | SYNCHRONIZATION FLAG |
|---|---|---|---|
| N1(10.1.1.1) | P1 | 1 | 0 |
| N1(10.1.1.1) | P2 | 1 | 0 |
| N2(10.2.1.1) | P3 | 1 | 0 |
| N3(10.3.1.1) | P4 | 1 | 0 |

1342: NODE SYNCHRONIZATION TABLE (CORRESPONDING TO NODE N3)

| NODE | PORT | ADDITION/DELETION FLAG | SYNCHRONIZATION FLAG |
|---|---|---|---|
| N1(10.1.1.1) | P1 | 1 | 0 |
| N1(10.1.1.1) | P2 | 1 | 0 |
| N2(10.2.1.1) | P3 | 1 | 0 |
| N3(10.3.1.1) | P4 | 1 | 0 |

| RECEPTION VIRTUAL PATH | STARTING POINT NODE | STARTING POINT PORT | END POINT NODE | END POINT PORT | USABLE FLAG |
|---|---|---|---|---|---|
| #11 | N1(10.1.1.1) | P1 | N1(10.1.1.1) | P1 | |
| #21 | N1(10.1.1.1) | P2 | N1(10.1.1.1) | P1 | |
| #31 | N2(10.2.1.1) | P3 | N1(10.1.1.1) | P1 | |
| #41 | N3(10.3.1.1) | P4 | N1(10.1.1.1) | P1 | |
| #12 | N1(10.1.1.1) | P1 | N1(10.1.1.1) | P2 | |
| #22 | N1(10.1.1.1) | P2 | N1(10.1.1.1) | P2 | |
| #32 | N2(10.2.1.1) | P3 | N1(10.1.1.1) | P2 | |
| #42 | N3(10.3.1.1) | P4 | N1(10.1.1.1) | P2 | |

142S

| STARTING POINT NODE | STARTING POINT PORT | END POINT NODE | END POINT PORT | TRANSMISSION VIRTUAL PATH | USABLE FLAG |
|---|---|---|---|---|---|
| N1(10.1.1.1) | P1 | N1(10.1.1.1) | P1 | #11 | |
| N1(10.1.1.1) | P1 | N1(10.1.1.1) | P2 | #12 | |
| N1(10.1.1.1) | P1 | N2(10.2.1.1) | P3 | #13 | |
| N1(10.1.1.1) | P1 | N3(10.3.1.1) | P4 | #14 | |
| N1(10.1.1.1) | P2 | N1(10.1.1.1) | P1 | #21 | |
| N1(10.1.1.1) | P2 | N1(10.1.1.1) | P2 | #22 | |
| N1(10.1.1.1) | P2 | N2(10.2.1.1) | P3 | #23 | |
| N1(10.1.1.1) | P2 | N3(10.3.1.1) | P4 | #24 | |

| RECEPTION VIRTUAL PATH IDENTIFIER | STARTING POINT NODE | STARTING POINT PORT | END POINT NODE | END POINT PORT | USABLE FLAG |
|---|---|---|---|---|---|
| #13 | N1(10.1.1.1) | P1 | N2(10.2.1.1) | P3 | |
| #23 | N1(10.1.1.1) | P2 | N2(10.2.1.1) | P3 | |
| #33 | N2(10.2.1.1) | P3 | N2(10.2.1.1) | P3 | |
| #43 | N3(10.3.1.1) | P4 | N2(10.2.1.1) | P3 | |

242 ↗

242S

| STARTING POINT NODE | STARTING POINT PORT | END POINT NODE | END POINT PORT IDENTIFIER | TRANSMISSION VIRTUAL PATH IDENTIFIER | USABLE FLAG |
|---|---|---|---|---|---|
| N2(10.2.1.1) | P3 | N1(10.1.1.1) | P1 | #31 | |
| N2(10.2.1.1) | P3 | N1(10.1.1.1) | P2 | #32 | |
| N2(10.2.1.1) | P3 | N2(10.2.1.1) | P3 | #33 | |
| N2(10.2.1.1) | P3 | N2(10.3.1.1) | P4 | #34 | |

| RECEPTION VIRTUAL PATH IDENTIFIER | STARTING POINT NODE | STARTING POINT PORT | END POINT NODE | END POINT PORT | USABLE FLAG |
|---|---|---|---|---|---|
| #14 | N1(10.1.1.1) | N1 | N3(10.3.1.1) | P4 | |
| #24 | N1(10.1.1.1) | Bport#2 | N3(10.3.1.1) | P4 | |
| #34 | N2(10.2.1.1) | Bport#3 | N3(10.3.1.1) | P4 | |
| #44 | N3(10.3.1.1) | Bport#4 | N3(10.3.1.1) | P4 | |

342S

| STARTING POINT NODE | STARTING POINT PORT | END POINT NODE | END POINT PORT | TRANSMISSION VIRTUAL PATH IDENTIFIER | USABLE FLAG |
|---|---|---|---|---|---|
| N3(10.3.1.1) | P4 | N1(10.1.1.1) | P1 | #41 | |
| N3(10.3.1.1) | P4 | N1(10.1.1.1) | P2 | #42 | |
| N3(10.3.1.1) | P4 | N2(10.2.1.1) | P3 | #43 | |
| N3(10.3.1.1) | P4 | N3(10.3.1.1) | P4 | #44 | |

FIG.18A

120': CONFIGURATION INFORMATION TABLE

| NODE |
|---|
| N1(10.1.1.1) |
| N1(10.1.1.1) |
| N2(10.2.1.1) |
| N3(10.3.1.1) |

FIG.18B

220': CONFIGURATION INFORMATION TABLE

| NODE |
|---|
| N1(10.1.1.1) |
| N1(10.1.1.1) |
| N2(10.2.1.1) |
| N3(10.3.1.1) |

FIG.18C

320': CONFIGURATION INFORMATION TABLE

| NODE |
|---|
| N1(10.1.1.1) |
| N1(10.1.1.1) |
| N2(10.2.1.1) |
| N3(10.3.1.1) |

| RECEPTION VIRTUAL PATH | STARTING POINT NODE | END POINT NODE |
|---|---|---|
| N#11 | N1(10.1.1.1) | N1(10.1.1.1) |
| N#21 | N2(10.2.1.1) | N1(10.1.1.1) |
| N#31 | N3(10.3.1.1) | N1(10.1.1.1) |

142S'

| STARTING POINT NODE | END POINT NODE | TRANSMISSION VIRTUAL PATH |
|---|---|---|
| N1(10.1.1.1) | N1(10.1.1.1) | N#11 |
| N1(10.1.1.1) | N2(10.2.1.1) | N#12 |
| N1(10.1.1.1) | N3(10.3.1.1) | N#13 |

| RECEPTION VIRTUAL PATH | STARTING POINT NODE | END POINT NODE |
|---|---|---|
| N#12 | N1(10.1.1.1) | N2(10.2.1.1) |
| N#22 | N2(10.2.1.1) | N2(10.2.1.1) |
| N#32 | N3(10.3.1.1) | N2(10.2.1.1) |

242S'

| STARTING POINT NODE | END POINT NODE | TRANSMISSION VIRTUAL PATH |
|---|---|---|
| N2(10.2.1.1) | N1(10.1.1.1) | N#21 |
| N2(10.2.1.1) | N2(10.2.1.1) | N#22 |
| N2(10.2.1.1) | N3(10.3.1.1) | N#23 |

| RECEPTION VIRTUAL PATH | STARTING POINT NODE | END POINT NODE |
|---|---|---|
| N#13 | N1(10.1.1.1) | N3(10.3.1.1) |
| N#23 | N2(10.2.1.1) | N3(10.3.1.1) |
| N#33 | N3(10.3.1.1) | N3(10.3.1.1) |

342S'

| STARTING POINT NODE | END POINT NODE | TRANSMISSION VIRTUAL PATH |
|---|---|---|
| N3(10.3.1.1) | N1(10.1.1.1) | N#31 |
| N3(10.3.1.1) | N2(10.2.1.1) | N#32 |
| N3(10.3.1.1) | N3(10.3.1.1) | N#33 |

VIRTUAL PATH CONFIGURATION APPARATUS, VIRTUAL PATH CONFIGURATION METHOD, AND COMPUTER PRODUCT

BACKGROUND OF THE INVENTION

1) Field of the Invention

The present invention relates to a technology for configuring a virtual path of a virtual private network (VPN).

2) Description of the Related Art

Recently, as the Internet spreads, companies that use the Internet (hereinafter, "user companies") are able to connect their branches without utilizing a virtually leased line service such as Asynchronous Transfer Mode (ATM) and a frame relay.

As to utilization in wide area network (WAN), a commercial communication service has started in 1994 in the United States, and a service of "super relay CR" has started by Nippon Telegraph and Telephone Corporation (NTT) in 1995 in Japan. In the next-generation B-ISDN proposed by NTT, a transmission speed was supposed to be heightened and public communication lines were supposed to be integrated based on ATM technology.

On the other hand, the development of ATM-LAN in which the ATM technology is applied to local area network (LAN) already makes progress in the early part of the nineties, and the ATM-LAN with a maximum transmission speed of 25 mega bits per seconds was standardized by an ATM-LAN forum. The ATM-LAN has a function of "LANE (LAN emulation)" which virtually provides the same service as that of Ethernet (Registered Trademark).

Commercialization of the ATM-LAN has started in 1992. However, it has not widely spread because it has taken a long time to standardize enormous specifications and low-priced Ethernet (Registered Trademark) has spread quickly.

Although the ATM is now spreading in WAN, Gigabit Ethernet (Registered Trademark), Fiber Distributed Data Interface (FDDI), and the like are more popular than ATM in LAN. At present, an attention is paid to enhancement of compatibility with explosively widespread Internet Protocol (IP). In Internet Engineering Task Force (IETF), "IP over ATM" which treats IP protocol on ATM network is developed.

Working groups are formed in the ATM forum last year, and specifications of "FAST" (Frame Relay ATM over SONET Transport) and the like which can treat a variable length cell expandable up to 64 Kilo bite are established.

In general, a user network uses a private address, and thus packet cannot directly flow to the Internet using global address.

To make communication between user network sites via the global Internet, therefore, the following mechanism is required. In the mechanism, encapsulation is made by IP packet having a global address, and the packet is transmitted from the user network via a global network to the global Internet, and the packet is received by a global network connecting router in a destination site and simultaneously the encapsulation is released, so as to be routed to a destination host in the destination site.

In this case, a user should prepare an apparatus which can start and terminate a tunnel (capable of encapsulating and decapsulating), and thus renewal and upgrading of equipment are necessary. Further, packet processing becomes complicated, performance may not be able to be heightened, or expensive equipment is possibly necessary to heighten the performance.

Further, when many branches are present, configuration of routers connected with the global Internet becomes complicated (control of paths, setting of logical interface, and the like). In this case, since user companies should educate administrators and maintain network equipment, the overall operation becomes expensive.

A new VPN service is considered, in which the maintenance of VPN is outsourced to an Internet service provider(s) or carriers and users can directly utilize user's existent routers as it is.

In this service, provider's routers provide the starting/terminating function of tunnels, and simultaneously, when a plurality of user sites are present, the provider's routers provide control of paths in the user network, which determines a tunnel to which encapsulated packet should be transmitted according to a destination user network.

At this time, a provider edge router transmits packet based on path information for the user network separately from path information for a global network. Such a VPN service is called as IP-VPN.

FIG. 34 is to explain how a virtual path is constructed in the VPN conventionally. LAN segments S1, S2, S3, and S4 are user network used by VPN users. Virtual paths #11 to #44 are set between ports P1 to P4 related with the LAN segments S1 to S4, so that VPN is configured.

The LAN segment S1 is attached to the port P1 of a node N1. The LAN segment S2 is attached to the port P2 of the node N1. "10.1.1.1" is given as an IP address to the node N1. A console C1 is provided correspondingly to the node N1, and it is used when a virtual path related with the node N1 (ports P1 and P2) is set.

The LAN segment S3 is attached to the port P3 of a node N2. A console C2 is used when a virtual path related with the node N2 (port P3) is set. "10.2.1.1" is given as an IP address to the node N2.

The LAN segment S4 is attached to the port P4 of a node N3. A console C3 is used when a virtual path related with the node N3 (port P4) is configured. "10.3.1.1" is given as an IP address to the node N3. Communication with the nodes N1 to N3 is made via a network NET.

A network administrator uses all the consoles C1 to C3 so as to individually log into every node from N1 to N3 and set information for configuring VPN in each node, so that the virtual paths #11 to #44 are configured (See Japanese Patent Application Laid-Open No. 2002-176436).

In the conventional art shown in FIG. 34, when the virtual path on the VPN is configured, a network administrator should log into every node from N1 to N3 individually by using every console from C1 to C3 and should set information for configuring VPN in each node. A great load, therefore, rests on the network administrator, and this conventional art has less convenience.

Particularly, as a number of nodes and ports becomes larger, the load becomes greater. Consequently, this problem becomes more serious.

SUMMARY OF THE INVENTION

It is an object of the present invention to solve at least the problems in the conventional technology.

A virtual path configuration apparatus according to one aspect of the present invention is used in a virtual private network to interconnect a plurality of user networks via virtual paths and that is arranged in each node. The virtual path configuration apparatus includes a configuration information setting unit that sets configuration information that is information about configuration of the virtual private network; a configuration information sharing unit that shares the configuration information with other virtual path configuration apparatuses in the virtual private network by transmitting the configuration information set by the configuration information setting unit to the other virtual path configuration apparatuses or receiving configuration information from the other virtual path configuration apparatuses; and a virtual path configuration unit that configures the virtual path based on the configuration information shared.

A virtual path configuration method according to another aspect of the present invention is executed on a virtual path configuration apparatus used in a virtual private network for interconnecting a plurality of user networks via virtual paths and that is arranged in each node. The virtual path configuration method includes setting configuration information that is information about configuration of the virtual private network; sharing the configuration information with other virtual path configuration apparatuses in the virtual private network by transmitting the configuration information set by the configuration information setting unit to the other virtual path configuration apparatuses or receiving configuration information from the other virtual path configuration apparatuses; and configuring the virtual path based on the configuration information shared.

A computer program according to still another aspect of the present invention realizes the virtual path configuration method according to the above aspect on a virtual path configuration apparatus that is a computer.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 5 is to explain contents of configuration information tables 120, 220, and 320;

FIGS. 6 and 7 are to explain contents of a configuration information synchronization table 132, and node synchronization tables 134₁ and 134₂;

FIG. 8 is a diagram to explain contents of a virtual path management table 142;

FIG. 9 is a diagram to explain contents of a virtual path management table 242;

FIG. 10 is a diagram to explain contents of a virtual path management table 342;

FIGS. 18A to 18C are to explain contents of configuration information tables 120', 220', and 320';

FIG. 19 is a diagram to explain contents of a virtual path management table 142';

FIG. 20 is a diagram to explain contents of a virtual path management table 242';

FIG. 21 is a diagram to explain contents of a virtual path management table 342';

DETAILED DESCRIPTION

Exemplary embodiments of a virtual path configuration apparatus and a virtual path configuration method according to the present invention are explained in detail below with reference to the accompanying drawings.

Figure 1:
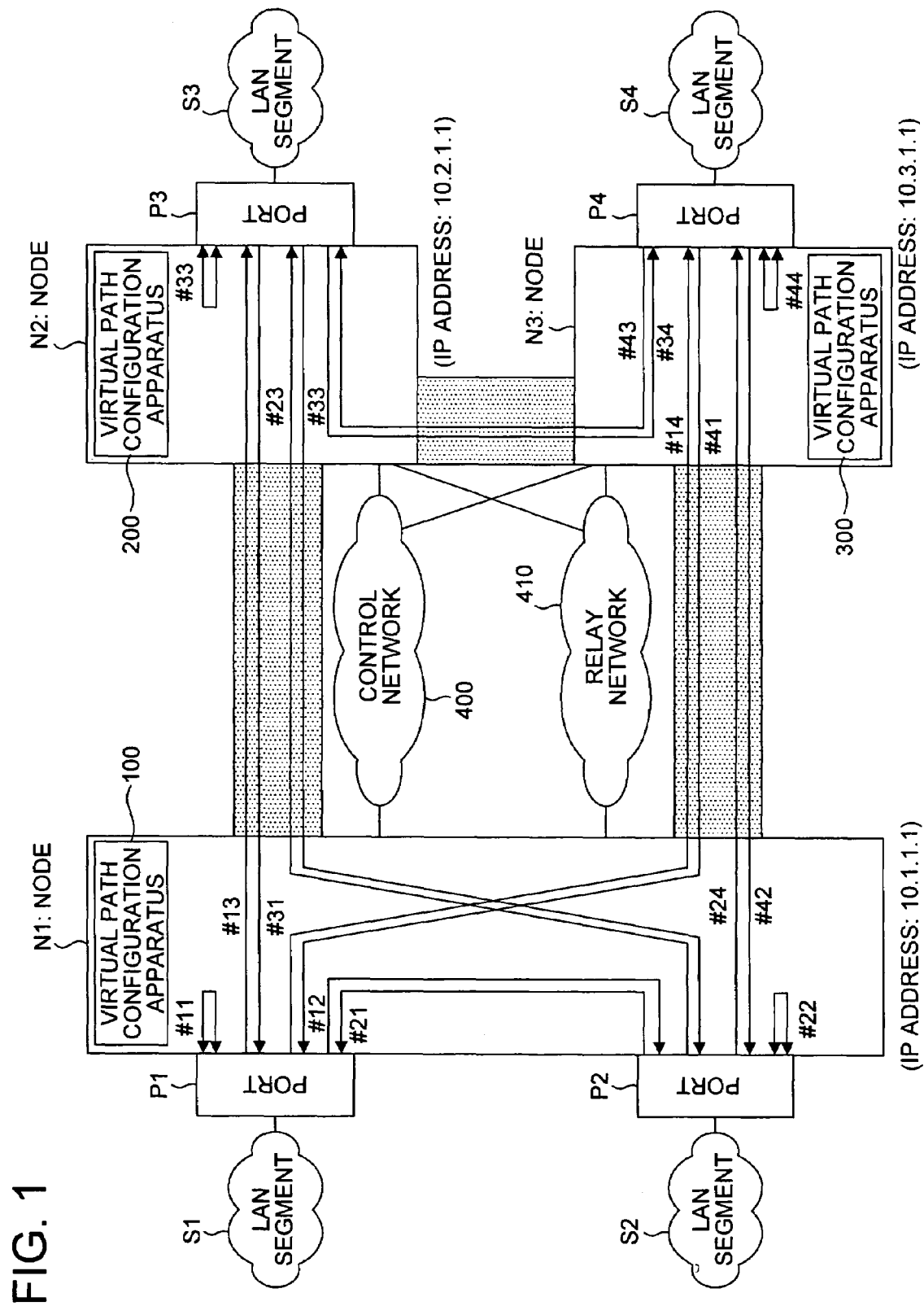
FIG. 1 is to explain how a virtual path is constructed according to an embodiment of the present invention in a VPN.
Figure 34:
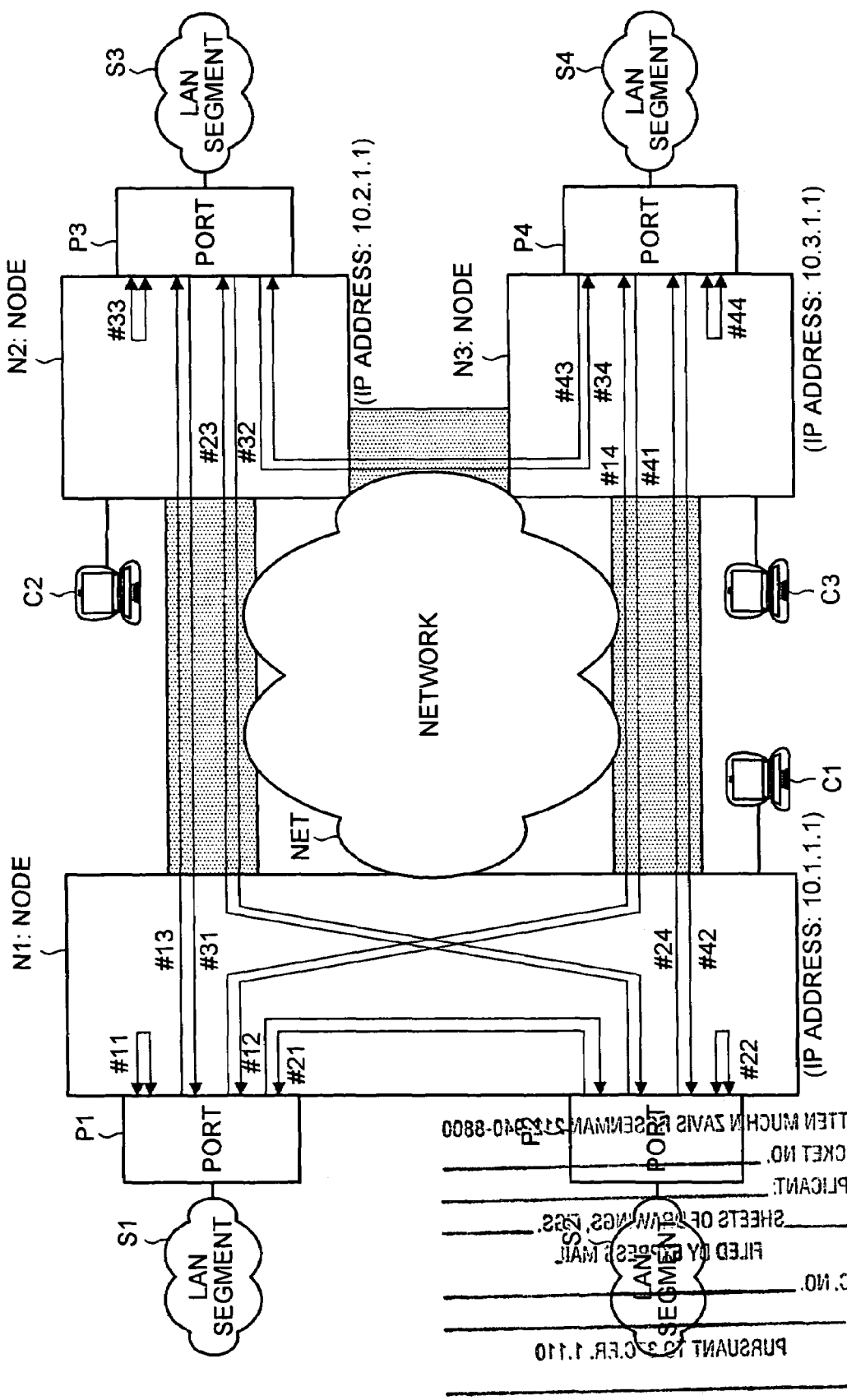
FIG. 34 is to explain how a virtual path is constructed conventionally in a VPN.

FIG. 1 is to explain how a virtual path is constructed according to an embodiment of the present invention in a VPN. Structural elements that perform same or similar functions or have same or similar configuration as those in FIG. 34 are designated by same reference numbers. As compared to FIG. 34, virtual path configuration apparatuses 100, 200, and 300 have been provided, and the consoles C1, C2, and C3 have been omitted.

The nodes N1, N2, and N3 are connected with each other via a control network 400 and a relay network 410. The control network 400 is used for configuring a virtual path in VPN and transmitting various information relating to establishment of connection between the nodes. Meanwhile, the relay network 410 is used for relaying data packet after the establishment of the connection.

The virtual path configuration apparatus 100 is provided at the node N1, the virtual path configuration apparatus 200 is provided at the node N2, and the virtual path configuration apparatus 300 is provided at the node N3. The virtual path configuration apparatuses 100, 200, and 300 configure virtual paths (#11 to #44) in the VPN.

Figure 2:
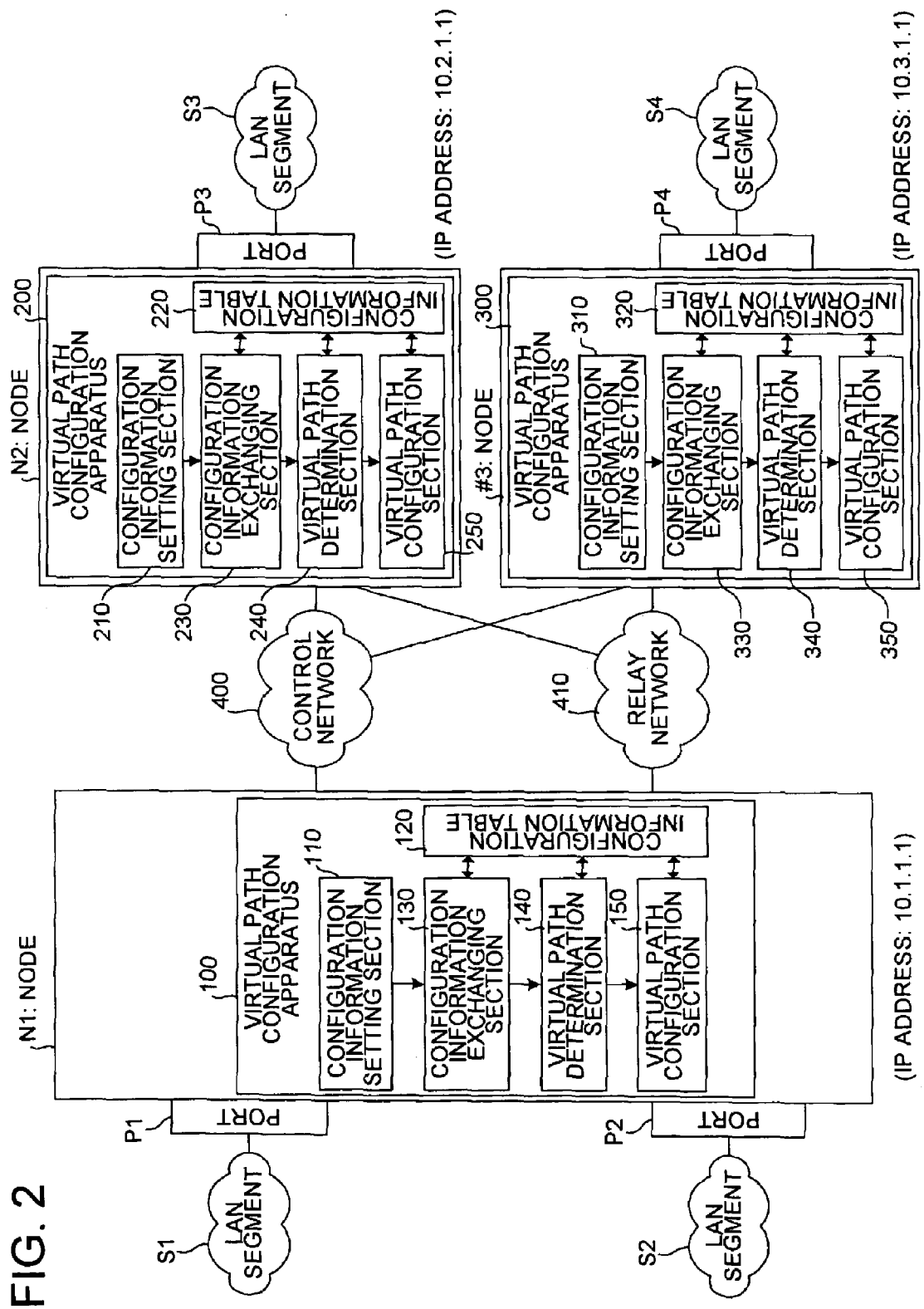
FIG. 2 is a detailed block diagram of virtual path configuration apparatuses 100, 200, and 300.

Detailed configuration of the virtual path configuration apparatuses 100, 200, and 300 is shown in FIG. 2. In the virtual path configuration apparatus 100, a configuration information setting section 110 is operated by a network administrator and is used for setting configuration information for specifying the configuration of VPN. The configuration information includes sets of ports and nodes.

For example, when VPN for communication between LAN segments S1, S2, and S3 is configured, the configuration information includes information about the node N1 and the port P1 for attaching the LAN segment S1, information about the node N1 and the port P2 for attaching the LAN segment S2, and information about the node N2 and the port P3 for attaching the LAN segment S3.

A configuration information table 120 is a table in which the configuration information is set. FIG. 5 (see (a)) illustrates a configuration information table 120 in which the configuration information corresponding to the above configuration example is set.

When VPN for communication between the LAN segments S1, S2, S3, and S4 is configured, the configuration information includes information about the node N1 and the port P1 for attaching the LAN segment S1, information about the node N1 and the port P2 for attaching the LAN segment S2, information about the node N2 and the port P3 for attaching the LAN segment S3, and information about the node N3 and the port P4 for attaching the LAN segment S4.

FIG. 5 (see (g)) illustrates the configuration information table 120 in which the configuration information corresponding to this configuration example is set.

The configuration information setting section 110 has a function for adding configuration information to the configuration information table 120, and a function for deleting configuration information from the configuration information table 120. At the time of addition, an adding command as a setting command and configuration information to be added are input from the configuration information setting section 110. On the other hand, at the time of deletion, a deleting command as a setting command and configuration information to be deleted are input from the configuration information setting section 110.

A configuration information exchanging section 130 (see FIG. 2) has a function for exchanging configuration information to be added or deleted between the nodes defined in the configuration information table 120 so as to share the information and synchronize the configuration information. The "synchronized state" here means that a node as a transmission destination of the configuration information receives the configuration information and transmits a response to a node as a transmission source, and both of the nodes can share the configuration information.

When both of the nodes synchronizes with each other, contents of the configuration information table provided to the nodes are the same as each other.

A virtual path determination section 140 determines a plurality of virtual paths so that the plural ports defined in the configuration information table 120 are in a full-mesh state. The virtual paths #11 to #44 are determined between the ports P1 to P4.

The virtual paths are expressed by numbers of two digits (x and y) after #. A number x represents a port of a starting point in the virtual paths. A number y represents a port of an end point in the virtual paths. For example, the virtual path #11 is a path from the port P1 as the starting point to the port P1 as the end point. The virtual path #21 is a path from the port P2 as the starting point to the port P1 as the end point.

A virtual path configuration section 150 has a function for configuring virtual paths determined by the virtual path determination section 140 on VPN.

The virtual path configuration apparatus 200 in the node N2 also includes a configuration information setting section 210, a configuration information table 220 (see (b) in FIG. 5), a configuration information exchanging section 230, a virtual path determination section 240, and a virtual path configuration section 250 similarly to the virtual path configuration apparatus 100.

The configuration information setting section 210, the configuration information table 220, the configuration information exchanging section 230, the virtual path determination section 240, and the virtual path configuration section 250 have the same configurations as those of the configuration information setting section 110, the configuration information table 120, the configuration information exchanging section 130, the virtual path determination section 140, and the virtual path configuration section 150.

The virtual path configuration apparatus 300 in the node N3 includes a configuration information setting section 310, a configuration information table 320 (see (c) is FIG. 5), a configuration information exchanging section 330, a virtual path determination section 340, and a virtual path configuration section 350 similarly to the virtual path configuration apparatus 100.

The configuration information setting section 310, the configuration information table 320, the configuration information exchanging section 330, the virtual path determination section 340, and the virtual path configuration section 350 have the same configurations as those of the configuration information setting section 110, the configuration information table 120, the configuration information exchanging section 130, the virtual path determination section 140, and the virtual path configuration section 150.

Figure 3:
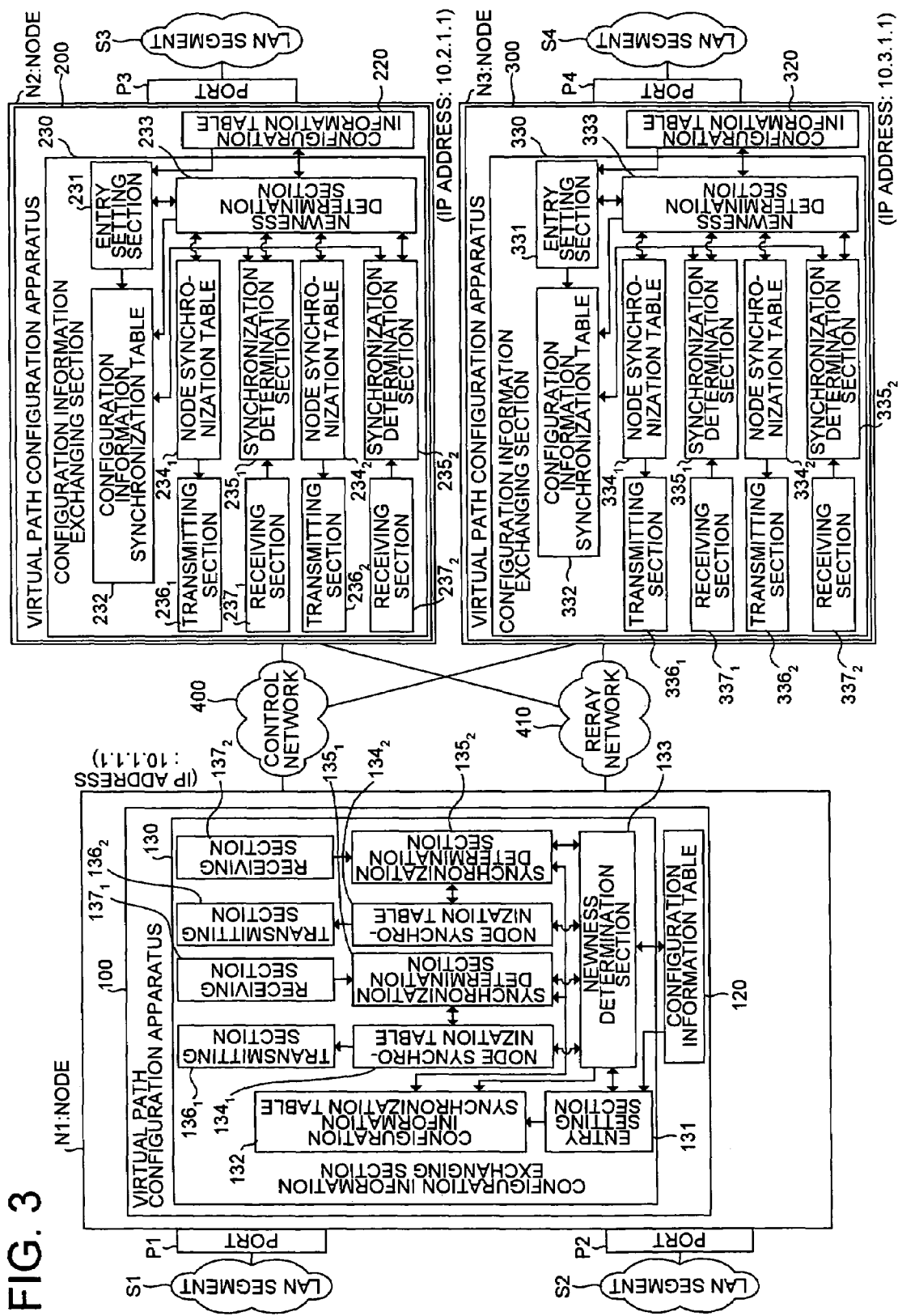
FIG. 3 is a block diagram of configuration information exchanging sections 130, 230, and 330.

FIG. 3 is a block diagram of configuration information exchanging sections 130, 230, and 330. In the configuration information exchanging section 130 in the virtual path configuration apparatus 100, when the configuration information setting section 110 sets (adds or deletes) the configuration information, an entry setting section 131 sets an entry (the configuration information, an addition/deletion flag and a synchronization flag) in the configuration information synchronization table 132.

Further, when a newness determination section 133 determines that the entry is new, the entry setting section 131, sets the entry in the configuration information synchronization table 132.

FIGS. 6 and 7 are to explain contents of a configuration information synchronization table 132, and node synchronization tables $134_1$ and $134_2$. In the configuration information synchronization table 132, the nodes and the ports correspond to the nodes and the ports in the configuration information table 120.

The addition/deletion flag is a flag which represents the setting command (adding command or deleting command) input by the configuration information setting section 110. Specifically, when the adding command for adding configuration information (information about node and port) into the configuration information table 120, the addition/deletion flag indicates is set to 1.

On the other hand, when the deleting command for deleting configuration information (information about node and port) from the configuration information table 120, the addition/deletion flag is set to 0.

The synchronization flag represents whether synchronization with the node as the exchanging destination of the configuration information is established. In the case of a synchronous state, the synchronization flag is set to 1. On the other hand, in the case of an asynchronous state, the synchronization flag is set to 0.

The newness determination section 133 compares node synchronization tables ($134_1$ and $134_2$) with the configuration information synchronization table 132, so as to determine whether the entry (configuration information) set by the entry setting section 131 is a new entry. When it is a new entry, the newness determination section 133 sets the configuration information (information about node and port) of the entry and the addition flag in the rest of the node synchronization table ($134_1$ or $134_2$).

The newness determination section 133 compares the entry, which is received from another node and set in the configuration information synchronization table 132 by the synchronization determination section ($135_1$ or $135_2$), with the node synchronization tables ($134_1$ and $134_2$) so as to determine whether the configuration information is new. When it is new, the newness determination section 133 sets the configuration information (information about node and port) of the entry and the addition/deletion flag in the node synchronization tables ($134_1$ and $134_2$).

The node synchronization table 1341, the synchronization determination section $135_1$, a transmitting section 1361, and a receiving section $137_1$ are provided correspondingly to the node N2 (a node synchronization table $234_1$, a synchronization determination section $235_1$, a transmitting section $236_1$, and a receiving section $237_1$). Further, they have a function for establishing synchronization of the configuration information between the nodes N1 and N2. As shown in FIG. 7, for example, the configuration information and the addition/deletion flag, which should be synchronized with the node N2 (virtual path configuration apparatus 200), and the synchronization flag are set in the node synchronization table $134_1$.

The information and the like transmitted from the transmitting section $136_1$ are received by the receiving section $237_1$ via the control network 400. The information and the like transmitted from the transmitting section $236_1$, are received by the receiving section $137_1$ via the control network 400.

The synchronization determination section $135_1$ determines whether the configuration information and the addition/deletion flag synchronize between the nodes N1 and N2 (virtual path configuration apparatus 200). Specifically, the synchronization determination section, $135_1$ transmits the configuration information and the addition/deletion flag set in the node synchronization table $134_1$ to the node N2 (virtual path configuration apparatus 200) via the control network 400.

When the receiving section $137_1$ receives a response message which represents that the configuration information and the addition/deletion flag are received from the node N2 (virtual path configuration apparatus 200), the synchronization determination section $135_1$ determines that the synchronization is established between the nodes N1 and N2. Further, the synchronization determination section $135_1$ match the node synchronization table entry with the acked entry using the configuration in formation and addition/deletion flag as a key and sets the synchronization flag of the matching entry in the node synchronization table $134_1$ (see FIG. 7) to 1.

The node synchronization table $134_2$, the synchronization determination section $135_2$, the transmitting section $136_2$, and the receiving section $137_2$ are provided correspondingly to the node N3 (a node synchronization table $334_1$, a synchronization determination section $335_1$, a transmitting section $336_1$, and a receiving section $337_1$). They have a function for establishing synchronization of the configuration information between the nodes N1 and N3. As shown in FIG. 7, the configuration information and the addition/deletion flag which should synchronize between the nodes N1 and N3 (virtual path configuration apparatus 300), and the synchronization flag are set in the node synchronization table $134_2$.

The receiving section $337_1$ receives the information and the like transmitted from the transmitting section $136_2$ via the control network 400. The receiving section $137_1$ receives the information and the like transmitted from the transmitting section $336_1$ via the control network 400.

The synchronization determination section $135_2$ determines whether synchronization of the configuration information and the addition/deletion flag is established between the nodes N1 and N3 (virtual path configuration apparatus 300). Specifically, the synchronization determination section $135_2$ transmits the configuration information and the addition/deletion flag set in the node synchronization table $134_2$ from the transmitting section $136_2$ via the control network 400 to the node N3 (virtual path configuration apparatus 300).

When the receiving section $137_2$ receives a response message which represents that the configuration information and the addition/deletion flag are received from the node N3 (virtual path configuration apparatus 300), the synchronization determination section $135_2$ determines that the synchronization is established between the nodes N1 and N3. The synchronization determination section $135_2$ match the node synchronization table entry with the acked entry using the configuration information and addition/deletion flag as a key, and sets the synchronization flag of the matching entry in the node synchronization table $134_2$ (see FIG. 7) to 1.

When the synchronization of the node synchronization table $134_2$ is established between the node N1 and a next node, the synchronization determination section $135_2$ sites it to the newness determination section 133. The newness determination section 133 checks corresponding synchronization flags of the node synchronization tables for all the nodes related with the entry of the configuration information synchronization table 132 whose synchronization flag is not set. When these flags in the node synchronization tables are all set, the newness determination section 133 sets the synchronization flag in the configuration information synchronization table 132.

In the configuration information exchanging section 230 of the node N2, when the configuration information setting section 210 (see FIG. 2) sets (adds or deletes) configuration information, an entry setting section 231 sets the entry (the configuration information, an addition/deletion flag, and a synchronization flag) in the configuration information synchronization table 232. The configuration information synchronization table 232 has the same configuration as that of the configuration information synchronization table 132 (see FIG. 6).

When the entry is a new entry or the previous entry is changed, however, the entry setting section 231 sets the entry in the configuration information synchronization table 232.

A newness determination section 233 compares the node synchronization tables ($234_1$ and $234_2$) with the configuration information synchronization table 232, and determines whether the entry (configuration information) set by the entry setting section 231 is a new entry. When it is a new entry, the newness determination section 233 sets the configuration information (information about node and port) and the addition/deletion flag of the entry in the node synchronization tables ($234_1$ and $234_2$).

The newness determination section 233 compares the entries, which are received at another nodes and set in the configuration information synchronization table 232 by the synchronization determination sections ($235_1$ and $235_2$), with the node synchronization tables ($234_1$ and $234_2$). The newness determination section 233 determines whether the configuration information is new. When it is new, the newness determination section 233 sets the configuration information (information about node and port) of the entries and the addition/deletion flags in the rest of the node synchronization tables ($234_1$ or $234_2$).

The node synchronization table $234_1$, the synchronization determination section $235_1$, the transmitting section $236_1$, and the receiving section $237_1$ are provided correspondingly to the node N1 (the node synchronization table $134_1$, the synchronization determination section $135_1$, the transmitting section $136_1$, and the receiving section $137_1$). They have a function for establishing the synchronization of the configuration information between the nodes N2 and N1. The configuration information, the addition/deletion flag, and the synchronization flag which should synchronize with the node N1 (virtual path configuration apparatus 100) are set in the node synchronization table $234_1$.

The receiving section $137_1$ receives the information and the like transmitted from the transmitting section $236_1$ via the control network 400.

The synchronization determination section $235_1$ determines whether the configuration information and the addition/deletion flag synchronize between the nodes N2 and N1 (virtual path configuration apparatus 100). Specifically, the synchronization determination section $235_1$ transmits the configuration information and the addition/deletion flag set in the node synchronization table $234_1$ from the transmitting section $236_1$ via the control network 400 to the node N1 (virtual path configuration apparatus 100).

When the receiving section $237_1$ receives a response message which represents that the configuration information and the addition/deletion flag are received from the node N1 (virtual path configuration apparatus 100), the synchronization determination section $235_1$ determines that the synchronization is established between the nodes N2 and N1. The synchronization determination section $235_1$ match the node synchronization table entry with the acked entry using the configuration information and addition/deletion flag as a key and sets the synchronization flag of the matching entry in the node synchronization table $234_1$ to 1.

The node synchronization table $234_2$, the synchronization determination section $235_2$, the transmitting section $236_2$, and the receiving section $237_2$ are provided correspondingly to the node N3 (a node synchronization table $334_2$, a synchronization determination section $335_2$, a transmitting section $336_2$, and a receiving section $337_2$). They have a function for establishing synchronization of the configuration information between the nodes N2 and N3. The configuration information, the addition/deletion flag, and the synchronization flag which synchronize between the nodes N2 and N3 (virtual path configuration apparatus 300) are set in the node synchronization table $234_2$.

The receiving section $337_2$ receives the information and the like transmitted from the transmitting section $236_2$ via the control network 400.

The synchronization determination section $235_2$ determines whether the configuration information and the addition/deletion flag synchronize between the nodes N2 and N3 (virtual path configuration apparatus 300). Specifically, the synchronization determination section $235_2$ transmits the configuration information and the addition/deletion flag set in the node synchronization table $234_2$ from the transmitting section $236_2$ via the control network 400 to the node N3 (virtual path configuration apparatus 300).

When the receiving section $237_2$ receives a response message which represents that the configuration information and the addition/deletion flag are received from the node N3 (virtual path configuration apparatus 300), the synchronization determination section $235_2$ determines that the synchronization is established between the nodes N2 and N3. The synchronization determination section $235_2$ match the node synchronization table entry with the acked entry using the configuration information and addition/deletion flag as a key, and sets the synchronization flag of the matching entry in the node synchronization table $234_2$ to 1.

Further, when synchronization of the node synchronization table $234_2$ with a next node is established, the synchronization determination section $235_2$ sites it to the newness determination section 233. The newness determination section 233 checks corresponding synchronization flags in the node synchronization tables of all the nodes related with an entry in the configuration information synchronization table 232 whose synchronization flag is not set. When these flags in the node synchronization tables are all set, the newness determination section 233 sets the synchronization flag in the configuration information synchronization table 232.

In the configuration information exchanging section 330 in the node N3, when the configuration information setting section 310 (see FIG. 2) sets (adds or deletes) configuration information, an entry setting section 331 sets the entry (the configuration information, the addition/deletion flag, and the synchronization flag) in the configuration information synchronization table 332. The configuration information synchronization table 332 has the same configuration as that of the configuration information synchronization table 132 (see FIG. 6).

When the entry is a new entry or a previous entry is changed, the entry setting section 331 sets the entry in the configuration information synchronization table 332.

A newness determination section 333 compares the node synchronization tables ($334_1$ and $334_2$) with the configuration information synchronization table 332, and determines whether the entry (configuration information) set by the entry setting section 331 is a new entry. When it is a new entry, the newness determination section 333 sets the configuration information (information about node and port) and the addition/deletion flag of the entry in the node synchronization tables ($334_1$ and $334_2$)

The newness determination section 333 compares the entries, which are received from another node and set in the configuration information synchronization table 332 by the synchronization determination sections ($335_1$ and $335_2$), with the node synchronization tables ($334_1$ and $334_2$). The newness determination section 333 determines whether the configuration information is new. When it is new, the newness determination section 333 sets the configuration information (information about node and port) and the addition/deletion flags of the entry in the rest of the node synchronization tables ($334_1$ or $334_2$).

The node synchronization table $334_1$, the synchronization determination section $335_1$, the transmitting section $336_1$, and the receiving section $337_1$ are provided correspondingly to the node N1 (the node synchronization table $134_1$, the synchronization determination section $135_2$, the transmitting section $136_2$, and the receiving section $137_2$). They have a function for establishing the synchronization of the configuration information between the nodes N3 and N1. The configuration information and the addition/deletion flag which should synchronize with the node N1 (virtual path configuration apparatus 100) are set in the node synchronization table $334_1$.

The receiving section $337_1$ receives the information and the like transmitted from the transmitting section $336_1$ via the control network 400.

The synchronization determination section $335_1$ determines whether the configuration information and the addition/deletion flag synchronize between the nodes N3 and N1 (virtual path configuration apparatus 100). Specifically, the synchronization determination section $335_1$ transmits the configuration information and the addition/deletion flag set in the node synchronization table $334_1$ from the transmitting section $336_1$ via the control network 400 to the node N1 (virtual path configuration apparatus 100).

When the receiving section $337_1$ receives a response message which represents that the configuration information and the addition/deletion flag are received from the node N1 (virtual path configuration apparatus 100), the synchronization determination section $335_1$ determines that the synchronization is established between the nodes N3 and N1. The synchronization determination section $335_1$ match the node synchronization table entry with the acked entry using the configuration information and addition/deletion flag as a key, and sets the synchronization flag of the matching entry in the node synchronization table $334_1$.

The node synchronization table $334_2$, the synchronization determination section $335_2$, the transmitting section $336_2$, and the receiving section $337_2$ are provided correspondingly to the node N2 (the node synchronization table $234_2$, the synchronization determination section $235_2$, the transmitting section $236_2$, and the receiving section $237_2$). They have a function for establishing the configuration information between the nodes N3 and N2. The configuration information, the addition/deletion flag, and the synchronization flag which synchronize between the nodes N3 and N2 (virtual path configuration apparatus 200) are set in the node synchronization table $334_2$.

The receiving section $237_2$ receives the information and the like transmitted from the transmitting section $336_2$ via the control network 400.

The synchronization determination section $335_2$ determines whether the configuration information and the addition/deletion flag synchronize between the nodes N3 and N2 (virtual path configuration apparatus 200). Specifically, the synchronization determination section $335_2$ transmits the configuration information and the addition/deletion flag set in the node synchronization table $334_2$ from the transmitting section $336_2$ via the control network 400 to the node N2 (virtual path configuration apparatus 200).

When the receiving section $337_2$ receives a response message which represents that the configuration information and the addition/deletion flag are received from the node N2 (virtual path configuration apparatus 200), the synchronization determination section $335_2$ determines that the synchronization is established between the nodes N3 and N2. The synchronization determination section $335_2$ match the node synchronization table entry with the acked entry using the configuration information and addition/deletion flag as a key, and sets the synchronization flag of the matching entry in the node synchronization table $334_2$.

Further, when synchronization of the node synchronization table $334_2$ with a next node is established, the synchronization determination section $335_2$ sites it to the newness determination section 333. The newness determination section 333 checks corresponding synchronization flags in the node synchronization tables of all the nodes related with an entry in the configuration information synchronization table 332 whose synchronization flag is not set. When these flags in the node synchronization tables are all set, the newness determination section 333 sets the synchronization flag in the configuration information synchronization table 332.

The configuration of the virtual path determination sections 140, 240, and 340 shown in FIG. 2 is detailed below with reference to FIG. 4. In the virtual path determination section 140 in the node N1, a virtual path calculating section 141 calculates a plurality of virtual paths based on a preset calculation policy (in this case, full mesh is realized between ports) so that full mesh is realized between the plural ports defined in the configuration information table 120. The virtual path calculating section 141 sets the calculated result in a virtual path management table 142. Virtual paths which star-connect the ports may be calculated in another calculation policy.

As shown in FIG. 8, the virtual path management table 142 includes a reception virtual path management table 142R which manages reception virtual paths, and a transmission virtual path management table 142S which manages transmission virtual paths. The virtual path management table 142 shown in FIG. 8 is set based on the full mesh of the ports P1 to P4, for example, defined in the configuration information table 120 shown in (g) in FIG. 5.

In the reception virtual path management table 142R, the reception virtual paths are virtual paths in a receiving direction viewed from the ports P1 and P2 in the node N1. The starting point node and the starting point port are a node and a port as starting points (transmission side) of the reception virtual path. The end point node and the end point port are a node and a port as the end points (reception side) of the reception virtual path.

For example, as the reception virtual paths, the virtual paths #11, #21, #31, and #41 in which the port P1 in the node N1 shown in FIG. 1 is the end point (reception side), and the virtual paths #12, #22, #32, and #42 in which the port P2 in the node N1 is the end point (reception side) are set.

Meanwhile, the transmission virtual path management table 142S, the transmission virtual paths are virtual paths in a transmission direction viewed from the ports P1 and P2 in the node N1. The starting point node and the starting point port are a node and a port as the starting points (transmission side) of the transmission virtual path. The end point node and the end point port are a node and a port as the end points (reception side) of the transmission virtual path.

For example, as the transmission virtual paths, the virtual paths #11, #12,#13, and #14 in which the port P1 in the node N1 shown in FIG. 1 is a starting point (transmission side), and the virtual paths #21, #22, #23, and #24 in which the port P2 in the node N2 is a starting point (transmission side) are set.

The virtual path configuration section 150 has the following function. The virtual path configuration section 150 refers to the virtual path management table 142. It exchanges path information (a path identifier, a starting point node, a starting point port, an end point node, and an end point port) about the virtual paths (reception virtual paths and transmission virtual paths) determined by the virtual path determination section 140 between the node N1 and another nodes by an information transmitting section 151 and a receiving section 152.

The first node sends out the path identifier for reception virtual paths, and sets the reception path identifier in the reception virtual path management table and also notified to other nodes as transmission virtual path identifier. Other nodes send out a path identifier of a transmission virtual path to the first node, and the first node set the received transmission virtual path identifier in the transmission virtual path management table of the first node.

Figure 4:
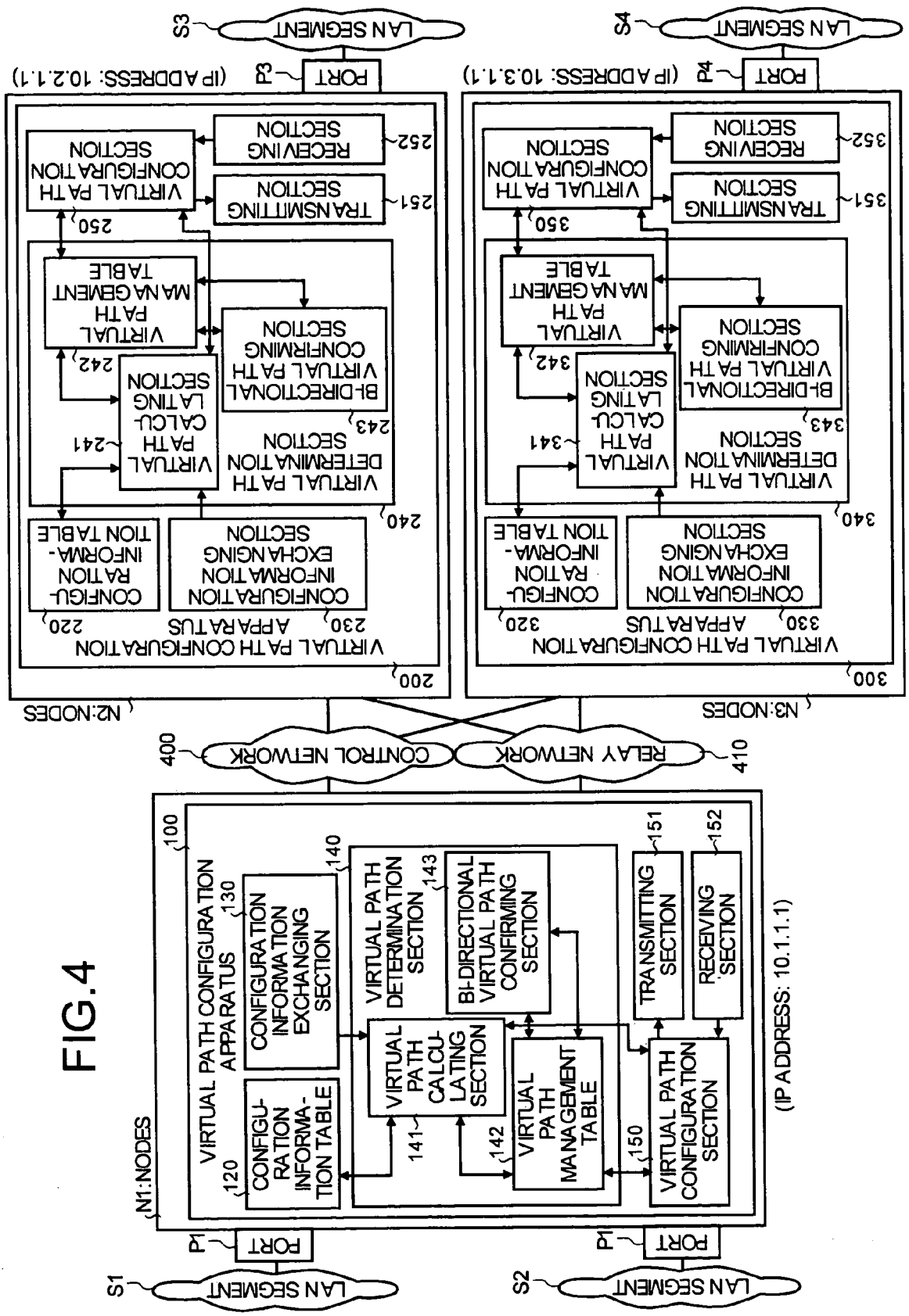
FIG. 4 is a block diagram of virtual path determination sections 140, 240, and 340 shown in FIG. 1.

With reference to FIG. 4, a bi-directional virtual path confirming section 143 has a function for referring to the virtual path management table 142 so as to confirm whether virtual paths (reception virtual path and transmission virtual path) can be set in both directions between the port P1 of the node N1 and a port of another node. When the virtual paths can be set in both the directions, the bi-directional virtual path confirming section 143 sets a usable flag in the virtual path management table 142.

Further, the virtual path determination section 240 of the node N2 has the same configuration as that of the virtual path determination section 140. That is to say, in the virtual path determination section 240, the virtual path calculating section 241 calculates a plurality of virtual paths based on the preset calculation policy (in this case, full mesh is realized between ports) so that full mesh is realized between the ports defined in the configuration information table 220. The virtual path calculating section 241 sets the calculated result in a virtual path management table 242.

As shown in FIG. 9, the virtual path management table 242 includes a reception virtual path management table 242R which manages reception virtual paths, and a transmission virtual path management table 242S which manages transmission virtual paths. The virtual path management table 242 shown in FIG. 9 is set based on full mesh of the ports P1 to P4, for example, defined in the configuration information table 220 shown in (h) in FIG. 5.

In the reception virtual path management table 242R, the reception virtual paths are virtual paths in the reception direction viewed from the port P3 of the node N2. The starting point node and the starting point port are a node and a port as the starting points (transmission side) of the reception virtual path. The end point node and the end point port are a node and a port as the end points (reception side) of the reception virtual path.

For example, as the reception virtual paths, the virtual paths #13, #23, #33, and #43 in which the port P3 of the node N2 shown in FIG. 1 is the end point (reception side) are set.

Meanwhile, in the transmission virtual path management table 242S, the transmission virtual paths are virtual paths in the transmission direction viewed from the port P3 of the node N2. The starting point node and the starting point port are a node and a port as the starting points (transmission side) of the transmission virtual path. The end point node and the end point port are a node and a port as the end points (reception side) of the transmission virtual path.

For example, as the transmission virtual paths, the virtual paths #31, #32, #33, and #34 in which the port P3 of the node N2 shown in FIG. 1 is the starting point (transmission side) are set.

The virtual path configuration section 250 has a function for referring to the virtual path management table 242, and exchanging path information (a path identifier, a starting point node, a starting point port, an end point node, and an end point port) about the virtual paths (reception virtual path and transmission virtual path) determined by the virtual path determination section 240 between the node N2 and another node by means of the information transmitting section 251 and the receiving section 252 so as to configure the virtual path for VPN.

The first node sends out the path identifier for the reception virtual paths, and sets the reception path identifier in the reception virtual path management table and also notified to other nodes as transmission virtual path identifier. Other nodes send out the path identifier of the transmission virtual path, and the first node set the received transmission virtual path identifier in the transmission virtual path management table in the first node.

With reference to FIG. 4, a bi-directional virtual path confirming section 243 has a function for referring to the virtual path management table 242 so as to confirm whether the virtual paths (reception virtual path and transmission virtual path) can be set in both the direction between the port P3 of the node N2 and a port in another node. When the virtual paths can be set in both the directions, the bi-directional virtual path confirming section 243 sets a usable flag in the virtual path management table 242.

The virtual path determination section 340 in the node N3 has the same configuration as that of the virtual path determination section 140. That is to say, in the virtual path determination section 340, the virtual path calculating section 341 calculates a plurality of virtual paths based on a preset calculation policy (in this case, full mesh is realized between the ports) so that full mesh is realized between the ports defined in the configuration information table 320. The virtual path calculating section 341 sets the calculated result in a virtual path management table 342.

As shown in FIG. 10, the virtual path management table 342 includes a reception virtual path management table 342R which manages the reception virtual paths, and a transmission virtual path management table 342S which manages the transmission virtual paths. The virtual path management table 342 shown in FIG. 10 is set based on full mesh of the ports P1 to P4, for example, defined in the configuration information table 320 shown in (i) in FIG. 5.

In the reception virtual path management table 342R, the reception virtual paths are virtual paths in the reception direction viewed from the port P4 of the node N3. The staring point node and the starting point port are a node and a port as the starting points (transmission side) of the reception virtual path. The end point node and the end point port are a node and a port as the end points (reception sides) of the reception virtual path.

For example, as the reception virtual paths, the virtual paths #14, #24, #34, and #44 in which the port P4 of the node N3 shown in FIG. 1 is the end point (reception side) are set.

Meanwhile, in the transmission virtual path management table 342S, the transmission virtual paths are virtual paths in the transmission direction viewed from the port P4 of the node N3. The staring point node and the starting point port are a node and a port as the starting points (transmission side) of the transmission virtual path. The end point node and the end point port are a node and a port as the end points (reception sides) of the transmission virtual path.

For example, as the transmission virtual paths, the virtual paths #41, #42, #43, and #44 in which the port P4 of the node N3 shown in FIG. 1 is the starting point (transmission side) are set.

The virtual path configuration section 350 has a function for referring to the virtual path management table 342, and exchanging path information (a path identifier, a starting point node, a starting point port, an end point node, and an end point port) about the virtual paths (reception virtual path and transmission virtual path) determined by the virtual path determination section 340 between the node 3 and another node by means of a information transmitting section 351 and a receiving section 352 so as to configure the virtual path for VPN.

The first node sends out the path identifier for the reception virtual paths, and sets the reception path identifier in the reception virtual path management table and also notified to other nodes as transmission virtual path identifier. Other nodes send out the path identifier of the transmission virtual path to the first node and the first node set the received transmission virtual path identifier in the transmission virtual path management table in the first node.

With reference to FIG. 4, a bi-directional virtual path confirming section 343 has a function for referring to the virtual path management table 342 so as to confirm whether virtual paths (reception virtual path and transmission virtual path)

can be set in both directions between the port P4 of the node N3 and a port of another node. When the virtual paths can be set in both the directions, the bi-directional virtual path confirming section 343 sets a usable flag in the virtual path management table 342.

Figure 11:
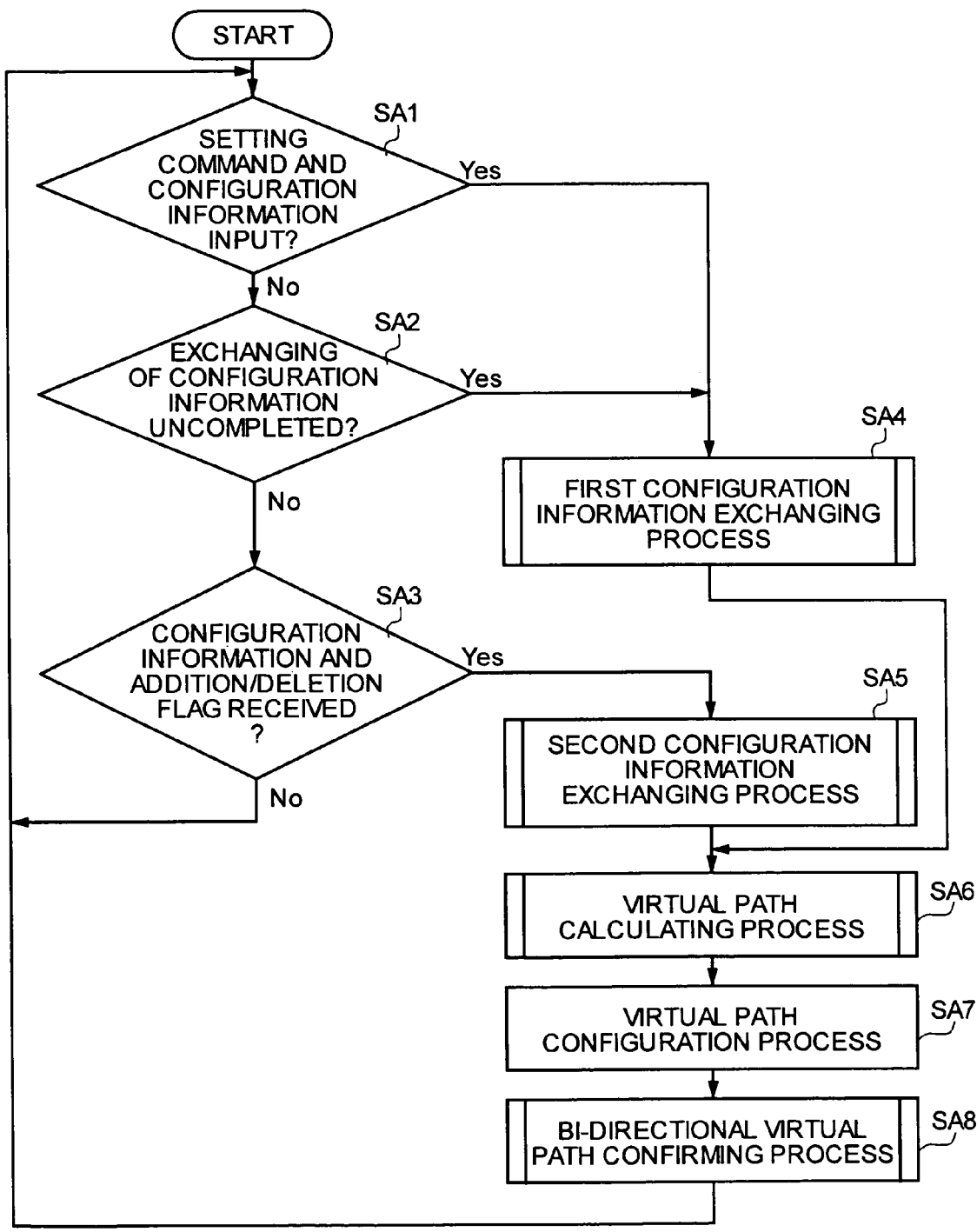
FIG. 11 is a flowchart operations performed by the virtual path configuration apparatuses 100, 200, and 300.

An operation of the embodiment is explained below with reference to flowcharts shown in FIGS. 11 to 16. FIG. 11 is the flowchart explaining the operation of the virtual path configuration apparatuses 100, 200, and 300 shown in FIGS. 1 to 4. The following explains the case where after the configuration information corresponding to the ports P1, P2, and P3 shown in FIG. 2 is initially set, the configuration information corresponding to the port P4 is added.

At step SA1 shown in FIG. 11, the configuration information exchanging section 130 of the virtual path configuration apparatus 100 shown in FIG. 2 determines whether a setting command (adding command or deleting command) and the configuration information are input into the configuration information setting section 110. In this case, the determined result is supposed to be "No".

At step SA2, the configuration information exchanging section 130 determines whether the configuration information, which is not finished to be exchanged with the virtual path configuration apparatuses in another nodes (in this case, the node N2 or N3), is present. In this case, the determined result is supposed to be "No".

At step SA3, the configuration information exchanging section 130 determines whether the configuration information and the addition/deletion flag are received from another node. In this case, the determined result is supposed to be "No". Thereafter, the configuration information exchanging section 130 repeats the determination at steps SA1 to SA3 until the determined result of steps SA1 to SA3 becomes "Yes".

The configuration information exchanging section 230 of the virtual path configuration apparatus 200, and the configuration information exchanging section 330 of the virtual path configuration apparatus 300 make the determination at steps SA1 to SA3.

The network administrator inputs the following configuration information corresponding to the ports P1, P2, and P3 as the configuration information for defining the configuration of VPN inter-connecting the LAN segments S1, S2, and S3 shown in FIG. 2, and the adding command as the setting command, for example, using the configuration information setting section 110.

(Configuration Information)
Node N1 (10.1.1.1), port P1, adding command
Node N1 (10.1.1.1), port P2, adding command
Node N2 (10.2.1.1), port P3, adding command As a result, the configuration information exchanging section 130 determines as "Yes" at step SA1. At step SA4, the configuration information and the addition/deletion flag are transmitted from a first node (in this case, the node N1) to another node (in this case, the node N2) included in the configuration information. A first configuration information exchanging process for exchanging the configuration information between a first node and another node is executed.

Figure 12:
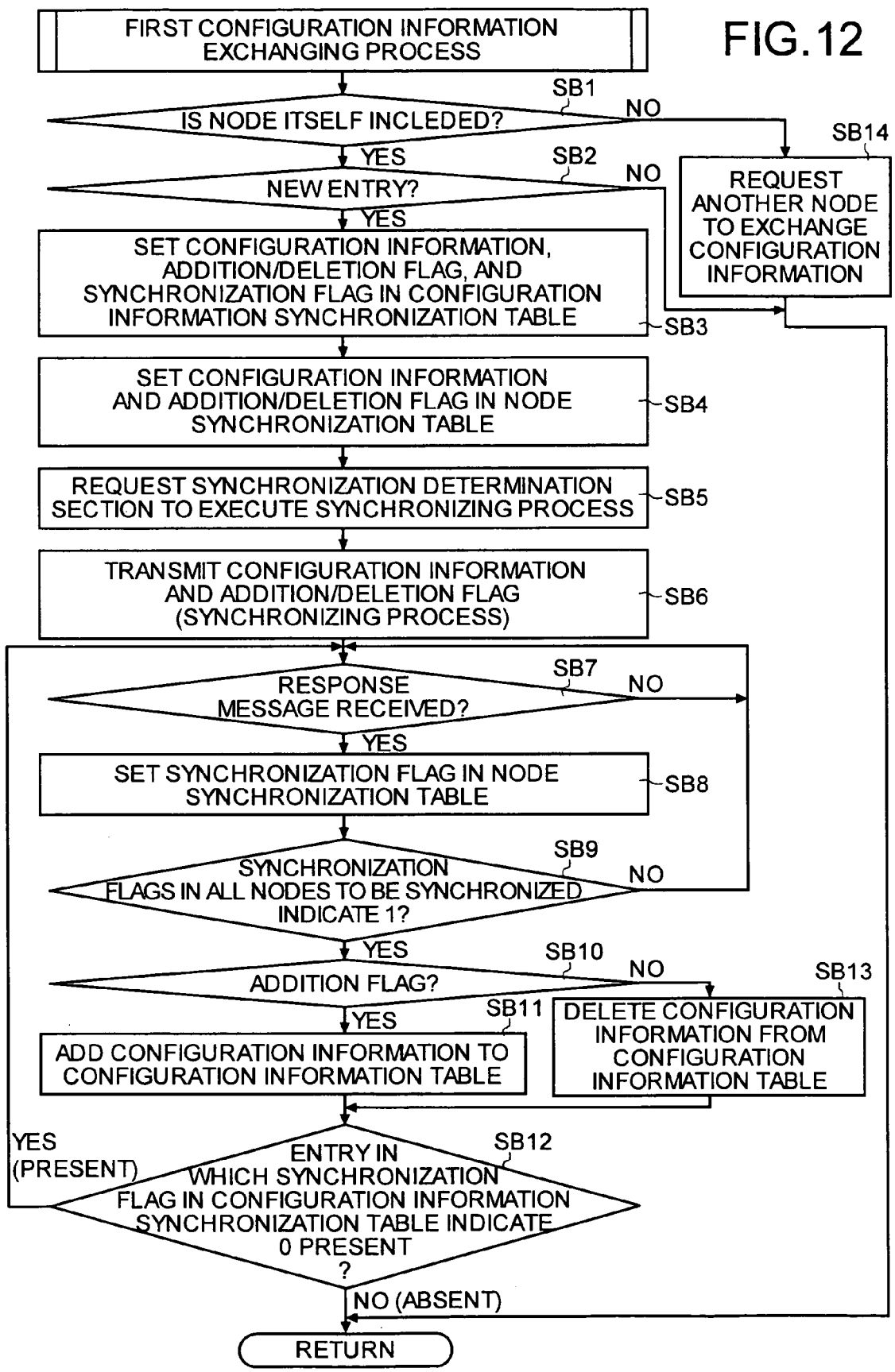
FIG. 12 is a flowchart of a first configuration information exchanging process.

Specifically, at step SB1 shown in FIG. 12, the configuration information exchanging section 130 shown in FIG. 3 determines whether the configuration information input by the configuration information setting section 110 includes the node itself (in this case, the node N1). In this case, the determined result is supposed to be "Yes".

At step SB2, the entry setting section 131 of the configuration information exchanging section 130 refers to the configuration information synchronization table 132, and determines whether the configuration information is a new entry or a previous entry is changed.

In this case, neither the configuration information nor the addition/deletion flag are set in the configuration information synchronization table 132. The entry setting section 131 makes the determination as "Yes" at step SB2. When the determined result at step SB2 is "No", the exchanging of the configuration information is not necessary.

At step SB3, the entry setting section 131, as shown in FIG. 6, sets the configuration information (node and port), the addition/deletion flag, and the synchronization flag in the configuration information synchronization table 132. In this case, since the setting command is the adding command, the addition/deletion flag indicates 1 (addition flag). Further, the synchronization flag indicates 0 (not synchronized) because synchronization is not established.

At step SB4, the newness determination section 133 selects another node (in this case, the node N2) as an exchanging destination of the configuration information from all the nodes included in the configuration information table 120 shown in (a) in FIG. 5.

The newness determination section 133 sets the configuration information and the addition/deletion flag obtained from the configuration information synchronization table 132 into the node synchronization table corresponding to another node. In this case, the newness determination section 133, as shown in FIG. 6, sets the configuration information and the addition/deletion flag in the node synchronization table $134_1$ corresponding to the node N2 as another node.

Since the node N3 is not included in the configuration information synchronization table 132 (see FIG. 6), no configuration information is set in the node synchronization table $134_2$ (see FIG. 6) corresponding to the node N3.

At step SB5, the newness determination section 133 requests a synchronization determination section (in this case, the synchronization determination section $135_1$) corresponding to another node (in this case, the node N2) selected at step SB6 to execute a synchronizing process.

At step SB6, the synchronization determination section (in this case, the synchronization determination section $135_1$) transmits the synchronization information and the addition/deletion flag set in the node synchronization table $134_1$ (see FIG. 6) from the transmitting section $136_1$ via the control network 400 to the exchanging destination (node N2).

At step SB7, the synchronization determination section (in this case, the synchronization determination section $135_1$) determines whether a response message is received from the exchanging destination (node N2). In this case, the determined result is supposed to be "No", and the transmission of the message including the synchronization information and the addition/deletion flag is repeated.

The synchronization determination section $135_1$ of the node N1 monitors the virtual path configuration apparatus 200 of the node N2. The synchronization determination section $135_1$ has a function such that when the response message is not received even if predetermined time passes, the network administrator is informed that any failure occurs in the virtual path configuration apparatus 200.

When the receiving section $237_1$ of the configuration information exchanging section 230 in the node N2 receives the synchronization information and the addition/deletion flag, the configuration information exchanging section 230 makes a determination as "Yes" at step SA3 shown in FIG. 11.

At step SA5, the response message is transmitted to the node N1 based on the configuration information and the addition/deletion flag received from the node N1. A second configuration information exchanging process for reflecting (adding or deleting) the configuration information on the configuration information table 220 is executed.

Figure 13:
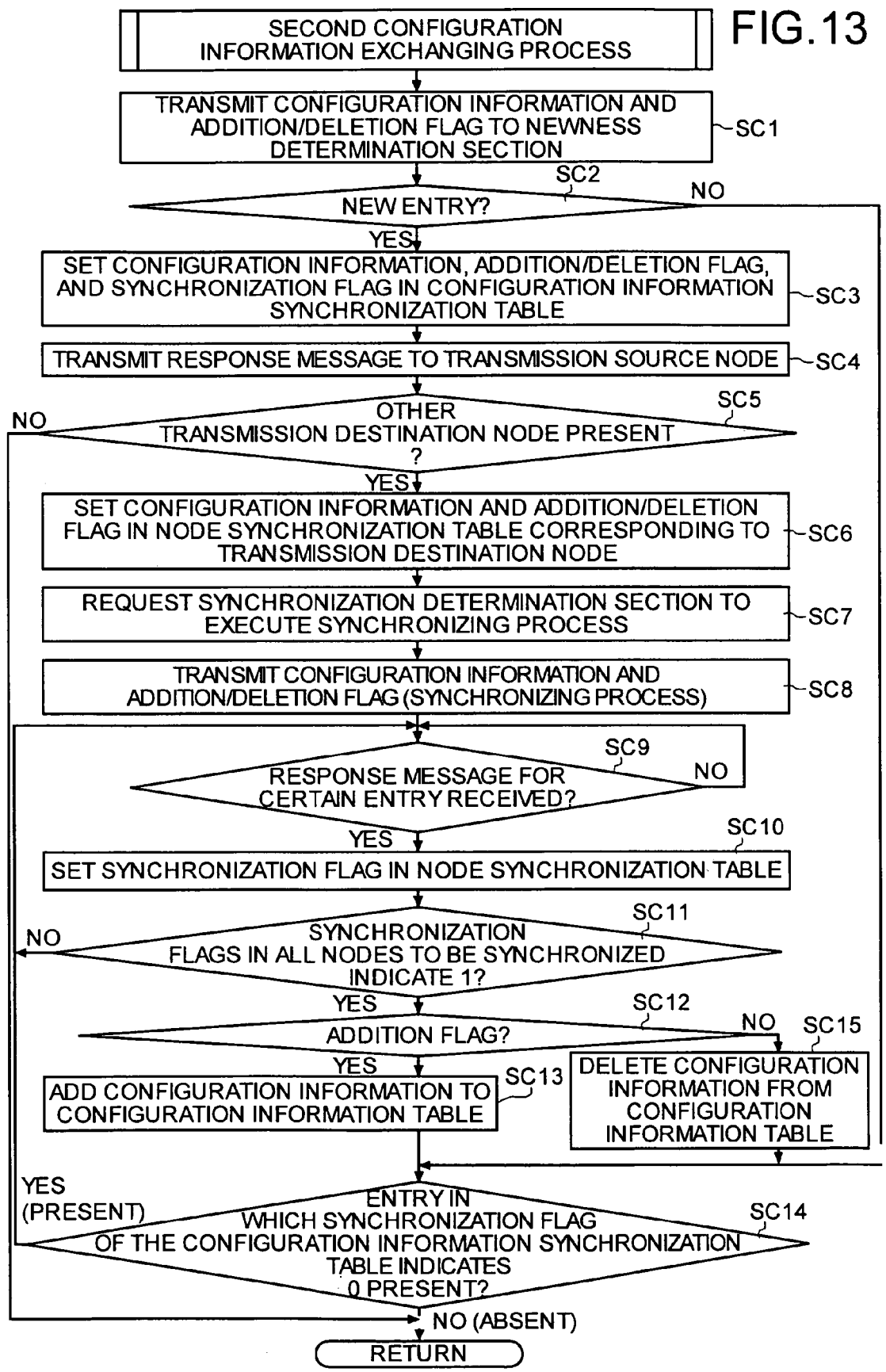
FIG. 13 is a flowchart of a second configuration information exchanging process.

Specifically, at step SC1 shown in FIG. 13, the synchronization determination section $235_1$ of the configuration information exchanging section 230 shown in FIG. 3 writes the configuration information and the addition/deletion flag (see FIG. 6) received by the receiving section $237_1$ into the node synchronization table. Further, the synchronization determination section $235_1$ sets the synchronization flag and notifies it to the newness determination section 233.

At step SC2, the newness determination section 233 of the configuration information exchanging section 230 compare the node synchronization table $234_1$ with configuration synchronization table 232, and determines whether the configuration information is a new entry. In this case, neither the configuration information nor the addition/deletion flag are set in the configuration synchronization table 232, and the newness determination section 233 makes a determination as "Yes" at step SC2. When the determined result at step SC2 is "No", the exchanging of the configuration information is not necessary.

At step SC3, the newness determination section 233 sets the configuration information (node and port), the addition/deletion flag, and the synchronization flag in the configuration information synchronization table 232 similarly to step SB3 (see FIG. 12).

At step SC4, the synchronization determination section $235_1$ transmits the response message from the transmitting section $236_1$ to a transmission source node (node N1).

When the response message is received by the node N1, the synchronization determination section $135_1$ determines as "Yes" at step SB7 shown in FIG. 12. At step SB8, the synchronization determination section $135_1$ sets the synchronization flag in the node synchronization table $134_1$ (see FIG. 6) for the entry, whose response message is received, to 1 according to the response message.

At step SB9, the synchronization determination section $135_1$ determines whether the synchronization of the node synchronization table is completed in all the nodes to be synchronized (in this case, only the node N2). In this case, the determined result is supposed to be "Yes". When the determined result at step SB9 is "No", the determination at SB7 is made.

At step SB10, the entry setting section 131 determines whether the addition/deletion flag set in the configuration information synchronization table 132 at step SB3 is the addition/flag (=1). In this case, the determined result is supposed to be "Yes". When the determined result at step SB10 is "No", namely, the addition/deletion flag is the deletion flag (=0), the entry setting section 131 deletes the configuration information corresponding to the deletion flag from the configuration information table 120 at step SB13.

At step SB11, the newness determination section 133 adds (see (a) FIG. 5) the configuration information corresponding to the addition flag to the configuration information table 120. At step SB12, the newness determination section 133 determines whether an entry such that the synchronization flag indicates 0 in the configuration information synchronization table 132 is present. When the determined result is "Yes (present)", the determination at step SB7 is made.

Meanwhile, the determined result at step SB12 is "No (absent)", the sequence returns to a main routine shown in FIG. 11. Thereafter, the sequence goes through the steps SA6 to SA8, mentioned later, based on the configuration information table 120 (see (a) in FIG. 5) and the configuration information table 220 (see (b) in FIG. 5), so that the virtual paths are configured.

With reference to FIG. 13, the newness determination section 233 determines whether a node (transmission destination node) other than the transmission source node (in this case, the node N1) and the node itself (in this case, the node N2) is present in the configuration information synchronization table 232 (see FIG. 6) at step SC5. In this case, the determined result is supposed to be "No".

The synchronization determination section $235_1$ sets the synchronization flag for the node N1 entry in the configuration information synchronization table 232 to 1. The synchronization flag corresponding to the node itself (node N2) is also set to 1.

When the determined result at step SC5 is "Yes", the newness determination section 233 sets configuration information and addition/deletion flag obtained from the configuration information synchronization table 232 in the node synchronization table (for example, node synchronization table $234_2$) corresponding to the transmission destination node (for example, the node N3) at step SC6.

At step SC7, the newness determination section 233 requests the synchronization determination section (in this case, the synchronization-determination section $235_2$) corresponding to the transmission destination node (for example, the node N3) to execute the synchronizing process.

At step SC8, the synchronization determination section (in this case, the synchronization determination section $235_2$) transmits the synchronization information and the addition/deletion flag set in the node synchronization table $234_2$ from the transmitting section $236_2$ via the control network 400 to an exchanging destination (node N3).

At step SC9, the synchronization determination section (in this case, the synchronization determination section $235_2$) determines whether a response message is received from the exchanging destination (node N3). In this case, the determined result is supposed to be "No", and the determination is repeated.

When the determined result at step SC9 becomes "Yes", at step SC10, the synchronization determination section $235_2$ sets the synchronization flag in the node synchronization table $234_2$ to 1 for the entry whose response message is received. At step SC11, the synchronization determination section $235_2$ determines whether the synchronization flag indicates 1 in all the nodes to be synchronized, and in this case, the determined result is supposed to be "Yes".

When the determined result at step SC11 is "No", the determination at step SC9 is made. At step SC12, the newness determination section 233 determines whether the addition/deletion flag set in the configuration information synchronization table 232 at step SC3, is the addition flag (=1). In this case, the determined result is supposed to be "Yes".

On the other hand, when the determined result at step SC12 is "No", namely, the addition/deletion flag is the deletion flag (=0), at step SC15, the newness determination section 233 deletes the configuration information corresponding to the deletion flag from the configuration information table 220. At step SC13, the newness determination section 233 adds the configuration information corresponding to the addition flag into the configuration information table 220 (see (b) in FIG. 5).

At step SC14, the newness determination section 233 determines whether the entry in which the synchronization flag in the configuration information synchronization table indicates 0 is present. When the determined result is "Yes (present)", the determination at step SC9 is made. Meanwhile, when the determined result at step SC14 is "No (absent)", the sequence returns to the main routine shown in FIG. 11. The sequence goes through the steps SA6 to SA8, mentioned later, based on the configuration information table 120 (see (a) in FIG. 5) and the configuration information table 220 (see (b) in FIG. 5), so that the virtual paths are configured.

The case where the port P4 of the node N3 is added to VPN including the port P1 of the node N1, the port P2 of the node N1, and the port P3 of the node N2 is explained below. Before the addition, the configuration information is set in the configuration information tables 120 and 220 (see (a) and (b) in FIG. 5). Meanwhile, no configuration information is set in the configuration information table 320.

In the case of addition, the network administrator inputs, for example, configuration information 121 (see (d) in FIG. 5) corresponding to the port P4 of the node N3, and the adding command as the setting command using the configuration information setting section 110 so that the LAN segment S4 is added to VPN which interconnects the LAN segments S1, S2, and S3 shown in FIG. 2.

As a result, the configuration information exchanging section 130 determines as "Yes" at step SA1. At step SA4, the first configuration information exchanging process is executed. Specifically, at step SB1 shown in FIG. 12, the configuration information exchanging section 130 shown in FIG. 3 determines whether the configuration information 121 input by the configuration information setting section 110 includes the node itself (in this case, the node N1). In this case, the determined result is supposed to be "No".

At step SB14, the configuration information exchanging section 130 requests another node (in this case, the node N3) included in the configuration information 121 to exchange the configuration information. In this case, the configuration information exchanging section 130 transmits configuration information (the configuration information set in the configuration information table 120 (see (a) in FIG. 5)) which has not been transmitted to the node N3, and the configuration information 121 (see (d) in FIG. 5) as the configuration information 321 (see (f) in FIG. 5) to the node N3. Further, the configuration information exchanging section 130 requests the exchanging of the configuration information.

As a result, the configuration information exchanging section 330 (configuration information exchanging section 230) of the node N3 determines as "Yes" at step SA2. As a result of exchanging the configuration information by the node N3, the nodes N1 and N2 execute the second configuration information exchanging process at step SA5.

As a result, as shown in (g) in FIG. 5, the configuration information 121 (node N3 and port P4) is added into the configuration information table 120 of the node N1. Moreover, as shown in (h) in FIG. 5, the configuration information 221 (see (e) in FIG. 5) is added into the configuration information table 220.

Further, as show in (i) in FIG. 5, the configuration information 321 (see (f) in FIG. 5) is set in the configuration information table 320. The same configuration information is set in the configuration information tables 120, 220, and 320.

The process at steps SA6 to SA8 shown in FIG. 11 is detailed below based on the configuration information tables 120, 220, and 320.

At step SA6, the virtual path calculating sections 141, 241, and 341 execute the virtual path calculating processes, respectively. The process of the virtual path calculating section 141 is explained below.

Figure 14:
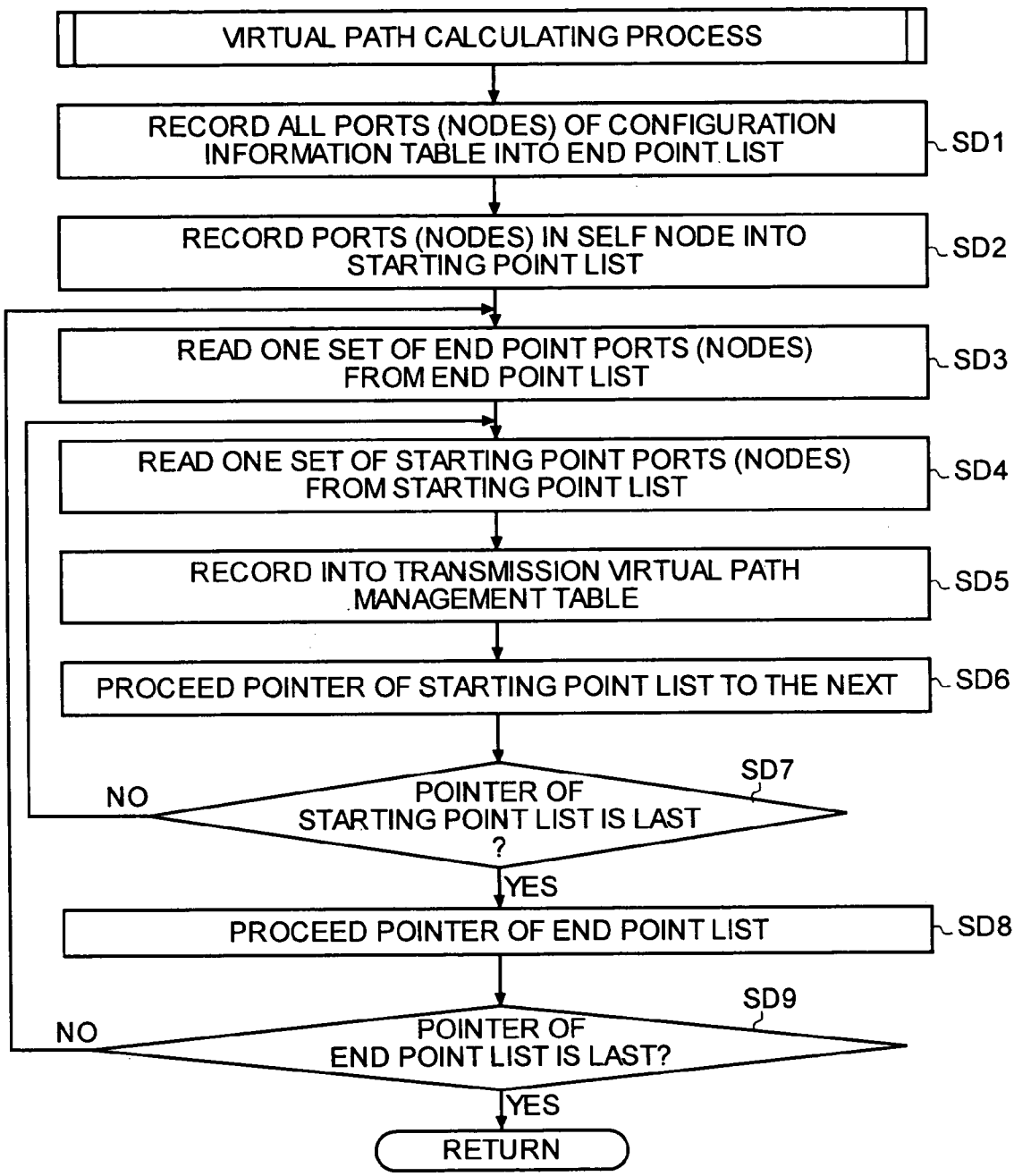
FIGS. 14 and 15 are flowcharts of a virtual path calculating process.

Specifically, at step SD1 shown in FIG. 14, to create the transmission virtual path management table 142S (see FIG. 8), the virtual path calculating section 141 records all the ports (nodes) of the configuration information table 120 (see (g) in FIG. 5) into an end point list (not shown). In this case, the end point list is as follows.

(End Point List)
 N1 (10.1.1.1), P1
 N1 (10.1.1.1), P2
 N2 (10.2.1.1), P3
 N3 (10.3.1.1), P4

At step SD2, the virtual path calculating section 141 records the ports (nodes) in the node itself (in this case, the node N1) into a starting point list (not shown). In this case, the starting point list is as follows.

(Starting Point List)
 N1 (10.1.1.1), P1
 N1 (10.1.1.1), P2

At step SD3, the virtual path calculating section 141 reads a pair of the end point port and the end point node from the end point list. At step SD4, the virtual path calculating section 141 reads a pair of the starting point port and the starting point node from the starting point list.

At step SD5, the virtual path calculating section 141 records information about the starting point node, the starting point port, the end point node, and the end point port into the transmission virtual path management table 142S shown in FIG. 8.

At step SD6, the virtual path calculating section 141 proceeds a pointer of the starting point list to the next. At step SD7, the virtual path calculating section 141 determines whether the pointer of the starting point list is the last. In this case, the determined result is supposed to be "No". Thereafter, steps SD4 to SD7 are repeated.

When the determined result at step SD7 becomes "Yes", the virtual path calculating section 141 proceeds the pointer of the end point list to the next at step SD8. At step SD9, the virtual path calculating section 141 determines whether the pointer of the end point list is the last. In this case, the determined result is supposed to be "No". Thereafter, the steps SD3 to SD9 are repeated.

When the determined result at step SD9 becomes "Yes", the creation of the transmission virtual path management table 142S shown in FIG. 8 is completed.

Figure 15:
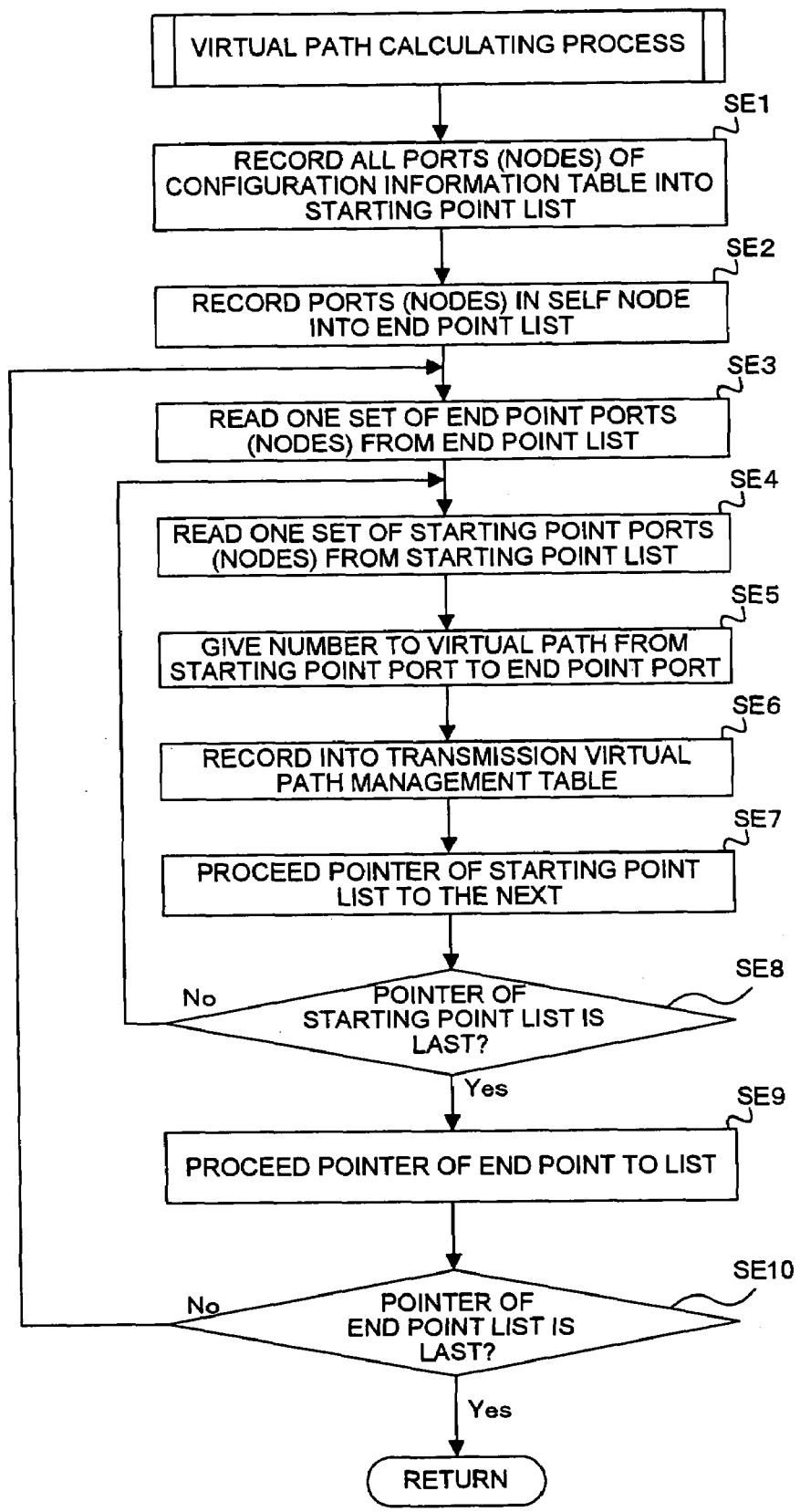

The reception virtual path management table 142R is created based on a virtual path calculating process shown in FIG. 15. In this case, however, at step SE1, to create the reception virtual path management table 142R (see FIG. 8), all the ports (nodes) of the configuration information table 120 (see (g) in FIG. 5) are recorded into the starting point list.

Further, at step SE2, the ports (nodes) in the node itself (in this case, the node N1) are recorded into the end point list.

At step SE5, a number (for example, #11) is given to the virtual path from the starting end port read at step SE4 to the end point port read at step SE3 as the reception virtual path.

At step SE6, information about the starting point node, the starting point port, the end point node, the end point port, and the reception virtual path is recorded into the reception virtual path management table 142R shown in FIG. 8.

The virtual path determination section 240 shown in FIG. 4 creates the virtual path management table 242 shown in FIG. 9 (the reception virtual path management table 242R and the transmission virtual path management table 242S).

Further, the virtual path determination section 340 shown in FIG. 4 creates the virtual path management table 342 shown in FIG. 10 (the reception virtual path management table 342R and the transmission virtual path management table 342S).

At step SA7 shown in FIG. 11, the virtual path configuration section 150 exchanges a message with another node by means of the transmitting section 151 and the receiving section 152, and simultaneously refers to the virtual path management table 142 (see FIG. 8) so as to configure the virtual paths (the reception virtual path and the transmission virtual path) determined by the virtual path determination section 140 over the relay network 410.

Specifically, the virtual path configuration section 150 puts the reception virtual path identifier, the starting point node, the starting point port, the end point node, and the end point port in the reception virtual path management table 142R into a message, so as to transmit the message to a node represented by the starting point node in the message.

Meanwhile, the virtual path configuration section 150 receives a message about the virtual paths in which the node itself is the starting point, which includes the virtual path identifier, the starting point node, the starting point port, the end point node, and the end point port, from another node.

When receiving this message, the virtual path configuration section 150 retrieves the starting point node, the staring point port, the end point node, and the end point port as a key from the transmission virtual path management table 142S. The virtual path configuration section 150 sets the virtual path identifier in the message into a transmission virtual path identifier field of the matched entry.

The virtual path configuration section 250 exchanges the message with another node by means of the transmitting section 251 and the receiving section 252, and simultaneously refers to the virtual path management table 242 (see FIG. 9), so as to configure the virtual paths (reception virtual path and transmission virtual path) determined by the virtual path determination section 240 over the relay network 410.

Specifically, the virtual path configuration section 250 puts the reception virtual path identifier, the starting point node, the starting point port, the end point node, and the end point port in the reception virtual path management table 242R into the message, so as to transmit the message to a node represented by the starting point node in the message.

Meanwhile, the virtual path configuration section 250 receives the message about the virtual path in which the node itself is the starting point, which includes the virtual path identifier, the starting point node, the starting point port, the end point node, and the end point port, from another node.

When receiving this message, the virtual path configuration section 250 retrieves the starting point node, the starting point port, the end point node, and the end point port as a key from the transmission virtual path management table 242S, so as to set the virtual path identifier in the message into a transmission virtual path identifier field of the matched entry.

The virtual path configuration section 350 exchanges the message with another node by means of the transmitting section 351 and the receiving section 352, and simultaneously refers to the virtual path management table 342 (see FIG. 10), so as to configure the virtual paths (reception virtual path and transmission virtual path) determined by the virtual path determination section 340 in the relay network 410.

Specifically, the virtual path configuration section 350 puts the reception virtual path identifier, the starting point node, the starting pint port, the end point node, and the end point port in the reception virtual path management table 342R into a message, so as to transmit the message to a node represented by the starting point node in the message.

Meanwhile, the virtual path configuration section 350 receives the message about the virtual path in which the node itself is the starting point, which includes the virtual path identifier, the starting point node, the starting point port, the end point node, and the end point port, from another node.

When receiving this message, the virtual path configuration section 350 retrieves the starting point node, the starting point port, the end point node, and the end point port as a key from the transmission virtual path management table 342S. The virtual path configuration section 350 sets the virtual path identifier in the message into a transmission virtual path identifier field of the matched entry.

FIG. 1 illustrates the virtual paths #11 to #44 configured over the relay network 410. In the embodiment, the virtual path configuration section 150 shown in FIG. 4 creates labels (for example, #11 is a label L11) for identifying the reception virtual paths and the transmission virtual paths in the virtual path management table 142 (see FIG. 8). The labels may be distributed to other nodes.

With reference to FIG. 11, at step SA8, the bi-directional virtual path confirming sections 143, 243, and 343 shown in FIG. 4 execute bi-directional virtual path confirming processes, respectively. The process of the bi-directional virtual path confirming section 143 is explained below.

Specifically, the bi-directional virtual path confirming section 143 refers to the virtual path management table 142 (see FIG. 8), and confirms whether virtual paths (reception virtual path and transmission virtual path) are set in both the directions between the ports P1 and P2 of the node N1, and the port of another node.

Figure 16:
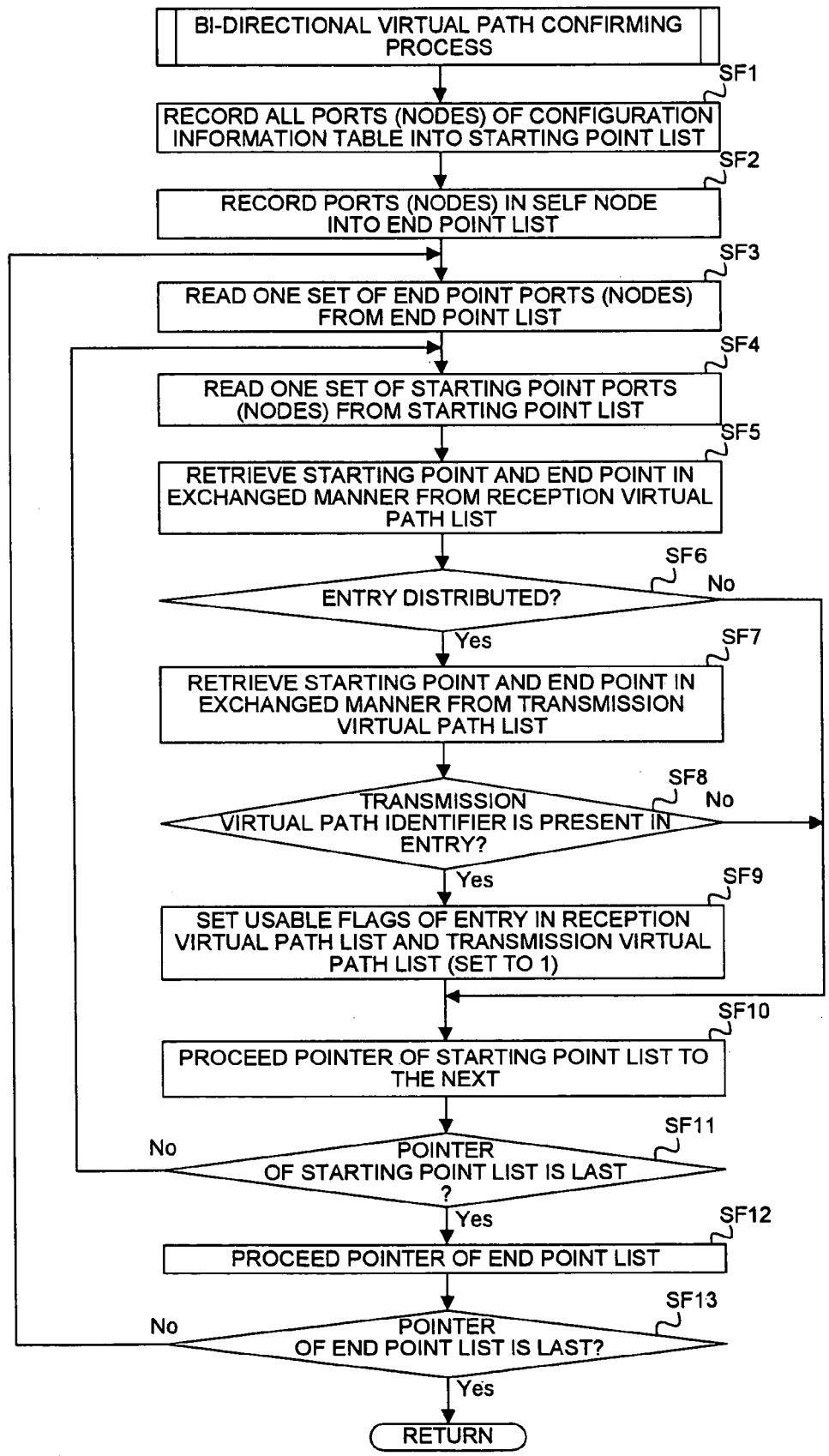
FIG. 16 is a flowchart of a bi-directional virtual path confirming process.

At steps SF1 to SF13 shown in FIG. 16, it is confirmed that the reception virtual path and the transmission virtual path are set in both the directions between any two ports of the ports included in the configuration information table 120. In this process, the virtual paths in which the ports P1 and P2 of the node N1 is the starting points or the end points are checked.

That is to say, at step SF1 shown in FIG. 16, the bi-directional virtual path confirming section 143 records all the ports (nodes) of the configuration information table 120 (see (g) in FIG. 5) into the starting point list (not shown). In this case, the starting point list is as follows.

(Starting Point List)
   N1 (10.1.1.1), P1
   N1 (10.1.1.1), P2
   N2 (10.2.1.1), P3
   N3 (10.3.1.1), P4

At step SF2, the bi-directional virtual path confirming section 143 records the ports (node) in the node itself (in this case, the node N1) into the end point list (not shown). In this case, the end point list is as follows.

(End Point List)
   N1 (10.1.1.1), P1
   N1 (10.1.1.1), P2

At step SF3, the bi-directional virtual path confirming section 143 reads one set of the end point port and the end point node from the end point list. At step SF4, the bi-directional virtual path confirming section 143 reads one set of the starting point port and the starting point node form the starting point list.

AT step SF5, the bi-directional virtual path confirming section 143 retrieves the starting point node and the starting point port read at step SF4, and the end point node and the end point port read at step SF3 as a key from the reception virtual path list-management table 142R (see FIG. 8).

At step SF6, the bi-directional virtual path confirming section 143 checks that the reception virtual path identifier is set and a distributed flag indicates 1. When the determined result at step SF6 is "No", the bi-directional virtual path confirming section 143 checks for a next pointer of the start point list at step SF10.

Meanwhile, when the determined result at step SF6 is "Yes", at step SF7, the bi-directional virtual path confirming section 143 retrieves the starting point node and the starting point port read at step SF4, and the end point node and the end point port read at step SF3 as a key from the transmission virtual path management table 142S (see FIG. 8) with the end point and the starting point being exchanged with each other.

At step SF8, it is checked that the transmission virtual path identifier is set in the entry. When the determined result at step SF8 is "No", the bi-directional virtual path confirming section 143 checks for a next point of the start point list at step SF10.

When the determined result at step SF8 becomes "Yes", the bi-directional virtual path confirming section 143 sets (to 1) usable flags of the entry in a reception virtual path list and a transmission virtual path list at step SF9.

At step SF10, the bi-directional virtual path confirming section 143 proceeds the pointer of the starting point list to the next. At step SF11, the bi-directional virtual path confirming section 143 determines whether the pointer of the starting point list is the last. In this case, the determined result is supposed to be "No". Thereafter, steps SF4 to SF11 are repeated.

At step SF12, the bi-directional virtual path confirming section 143 proceeds the pointer of the end point list to the next. At step SF13, the bi-directional virtual path confirming section 143 determines whether the pointer of the end point list is the last. In this case, the determined result is supposed to be "No". Thereafter, steps SF3 to SF13 are repeated.

Similarly to the bi-directional virtual path confirming section 143, the bi-directional virtual path confirming section 243 refers to the virtual path management table 242 (see FIG. 9), and confirms the both directions. Similarly to the bi-directional virtual path confirming section 143, the bi-directional virtual path confirming section 343 refers to the virtual path management table 342 (see FIG. 10), and confirms both the directions.

Figure 17:
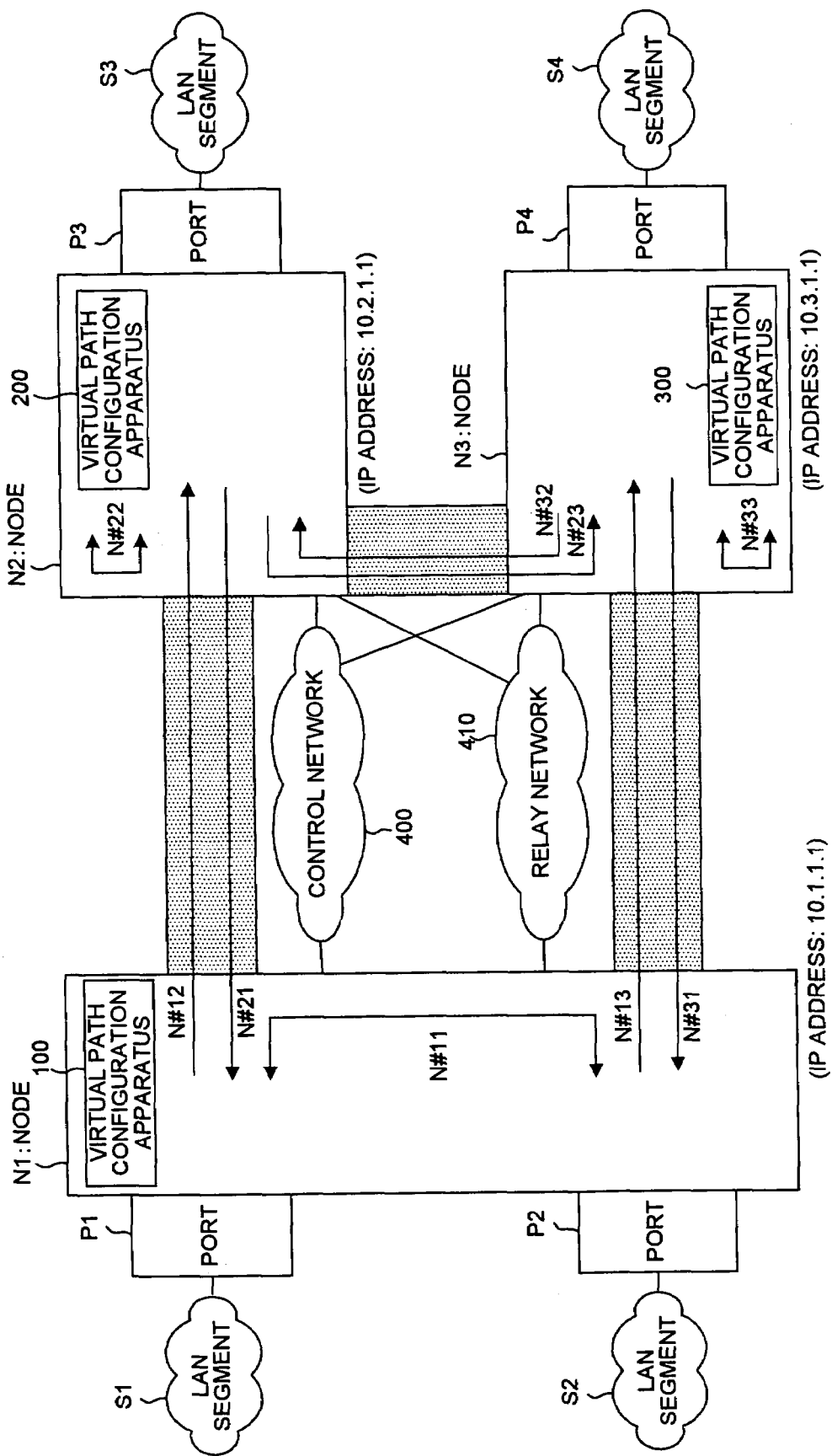
FIG. 17 is a block diagram of a first modification of the present invention.

As explained with reference to FIG. 1, the embodiment explains the configuration example such that the configuration information including the nodes and the ports is exchanged between the nodes, and the virtual paths #11 to #44 are configured between the ports. As shown in FIG. 17, however, a configuration example may be such that virtual paths N#11 to N#33 may be configured between the nodes. This configuration example is explained below as a first modification of the embodiment.

The virtual paths in the first modification are expressed by numbers of two digits (x' and y') after N#. The number x' represents a node of a starting point in the virtual path. The number y' represents a node of an end point in the virtual path. For example, the virtual path N#11 is a path from the node N1 as the starting point to the node N1 as the end point. Further, the virtual path N#21 is a path from the node N2 as the starting point to the node N1 as the end point.

In the first modification, instead of the configuration information tables 120, 220, and 320 shown in FIG. 5 (see (g), (h), and (i)), configuration information tables 120', 220', and 320' shown in FIGS. 18A, 18B, and 18C are used.

The configuration information tables 120', 220', and 320' store only information about nodes composing VPN.

In the first modification, in the virtual path configuration apparatus 100 shown in FIG. 17, instead of the virtual path management table 142 shown in FIG. 18 (the reception virtual path management table 142R and the transmission virtual path management table 142S), a virtual path management table 142' shown in FIG. 19 (a reception virtual path management table 142R' and a transmission virtual path management table 142S') is created. The virtual path management table 142' is created based on the configuration information table 120' (see FIG. 18A).

Similarly, in the virtual path configuration apparatus 200 shown in FIG. 17, instead of the virtual path management table 242 shown in FIG. 9 (the reception virtual path management table 242R and the transmission virtual path management table 242S), a virtual path management table 242' shown in FIG. 20 (a reception virtual path management table 242R' and a transmission virtual path management table 242S') is created. The virtual path management table 242' is created based on the configuration information table 220' (see FIG. 18B).

Similarly, in the virtual path configuration apparatus 300 shown, in FIG. 17, instead of the virtual path management table 342 shown in FIG. 10 (the reception virtual path management table 342R and the transmission virtual path management table 342S), a virtual path management table 342' shown in FIG. 21 (a reception virtual path management table 342R' and a transmission virtual path management table 342S') is created. The virtual path management table 342' is created based on the configuration information table 320' (see FIG. 18C).

Figure 22:
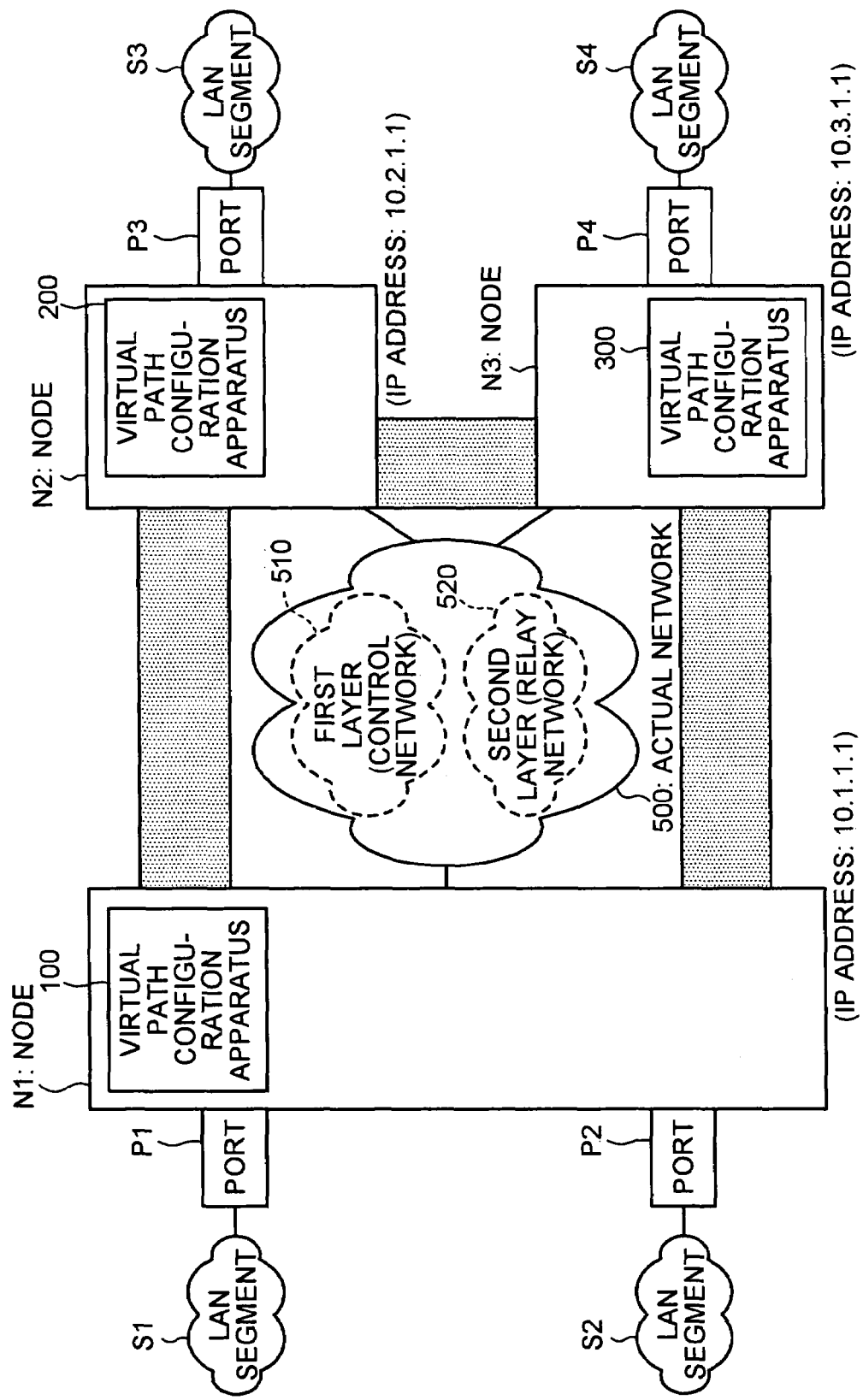
FIG. 22 is to explain a second modification of the embodiment.

The embodiment shown in FIG. 1 explains the configuration example where the control network 400 and the relay network 410 are provided between the nodes (virtual path configuration apparatuses). Like a second modification shown in FIG. 22, however, an actual network 500 may be provided, a first layer 510 may be used as the control network, and a second layer 520 may be used as the relay network.

Figure 23:
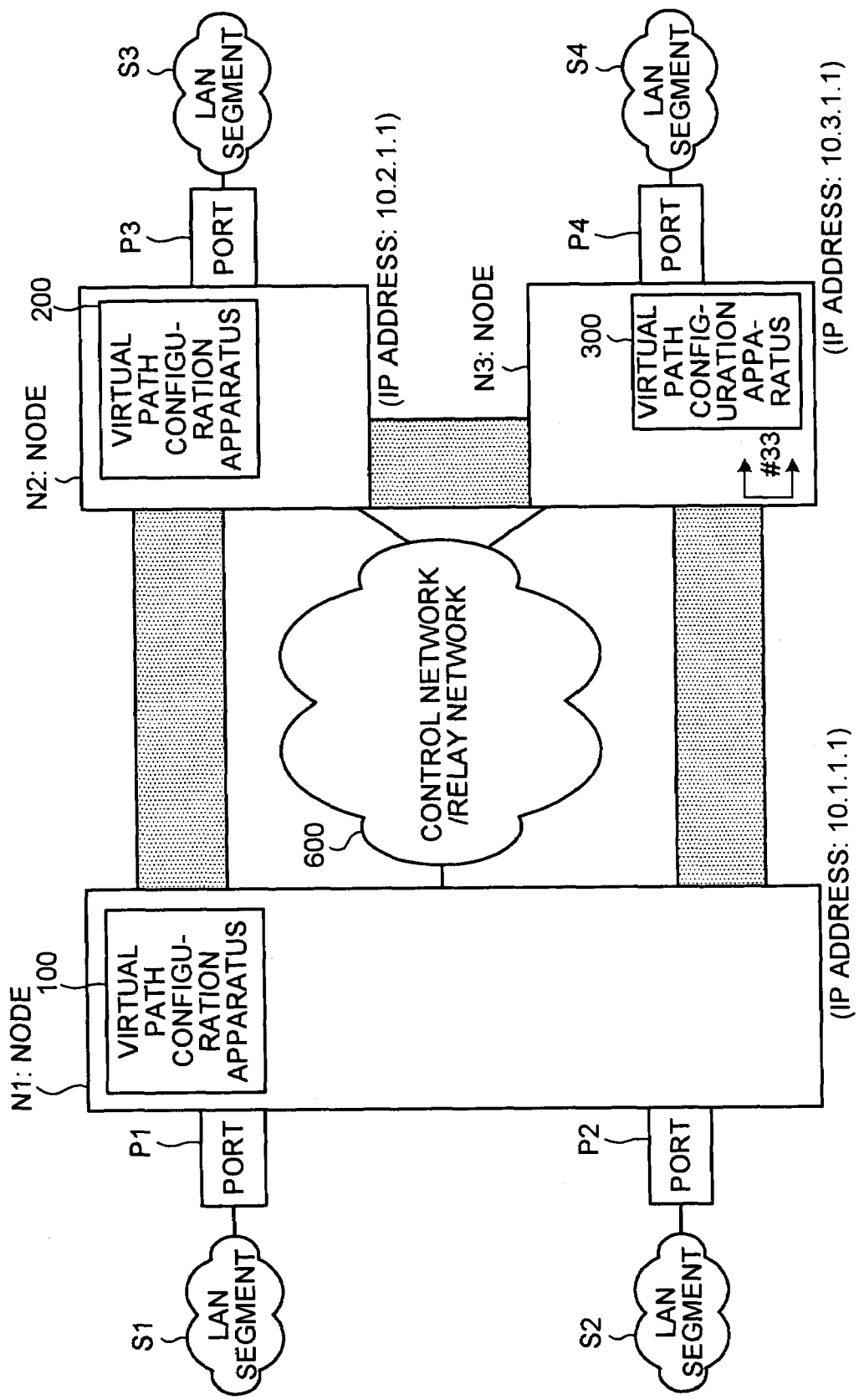
FIG. 23 is to explain a third modification of the embodiment.

The embodiment shown in FIG. 1 explains the configuration example where the control network 400 and the relay network 410 are provided between the nodes (virtual path configuration apparatuses). Like a third modification shown in FIG. 23, however, a control network/relay network 600 where the control network and the relay network are constituted on one network and layer may be used.

Figure 24:
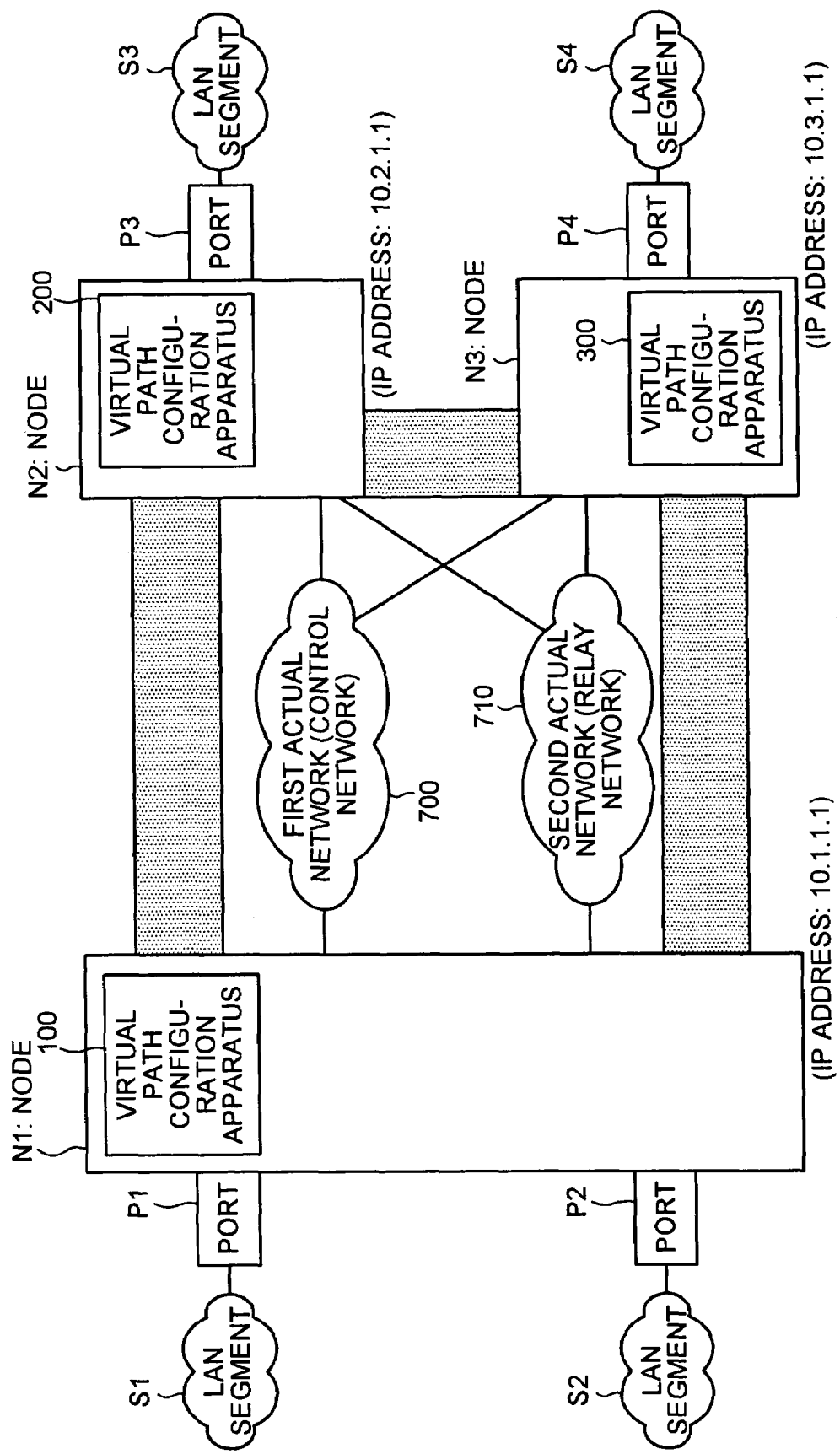
FIG. 24 is to explain a fourth modification of the embodiment.

The embodiment shown in FIG. 1 explains the configuration example where the control network 400 and the relay network 410 are provided between the nodes (virtual path configuration apparatuses). Like a fourth modification shown in FIG. 24, however, a first actual network 700 may be used as the control network, and a second actual network 710 may be used as the relay network.

Figure 25:
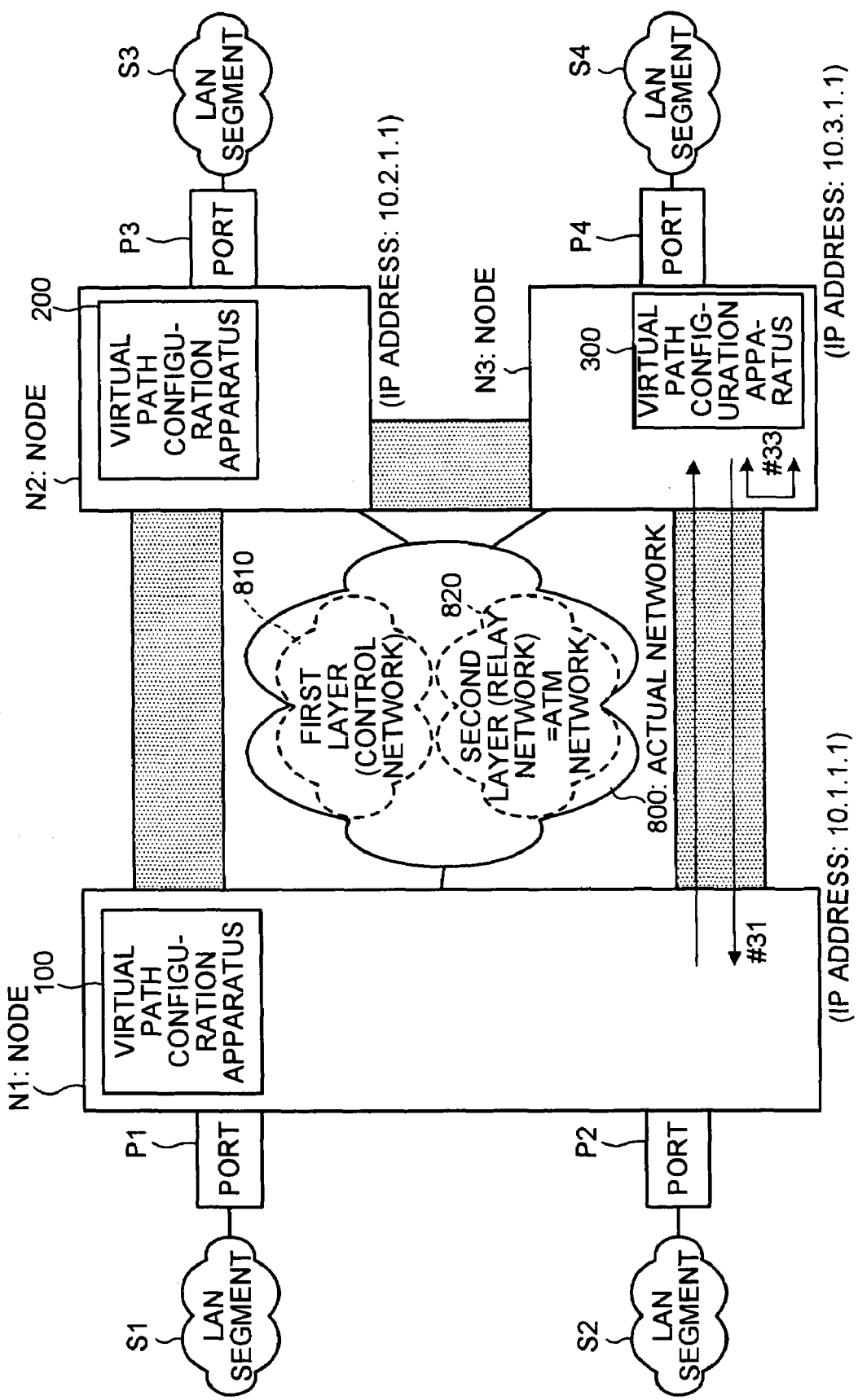
FIG. 25 is to explain a fifth modification of the embodiment.

The embodiment shown in FIG. 1 explains the configuration example where the control network 400 and the relay network 4110 are provided between the nodes (virtual path configuration apparatuses). Like a fifth modification shown in FIG. 25, however, an actual network 800 may be provided, a first layer 810 may be used as the control network, and a second layer 820 may be used as a relay network (=ATM network).

Figure 26:
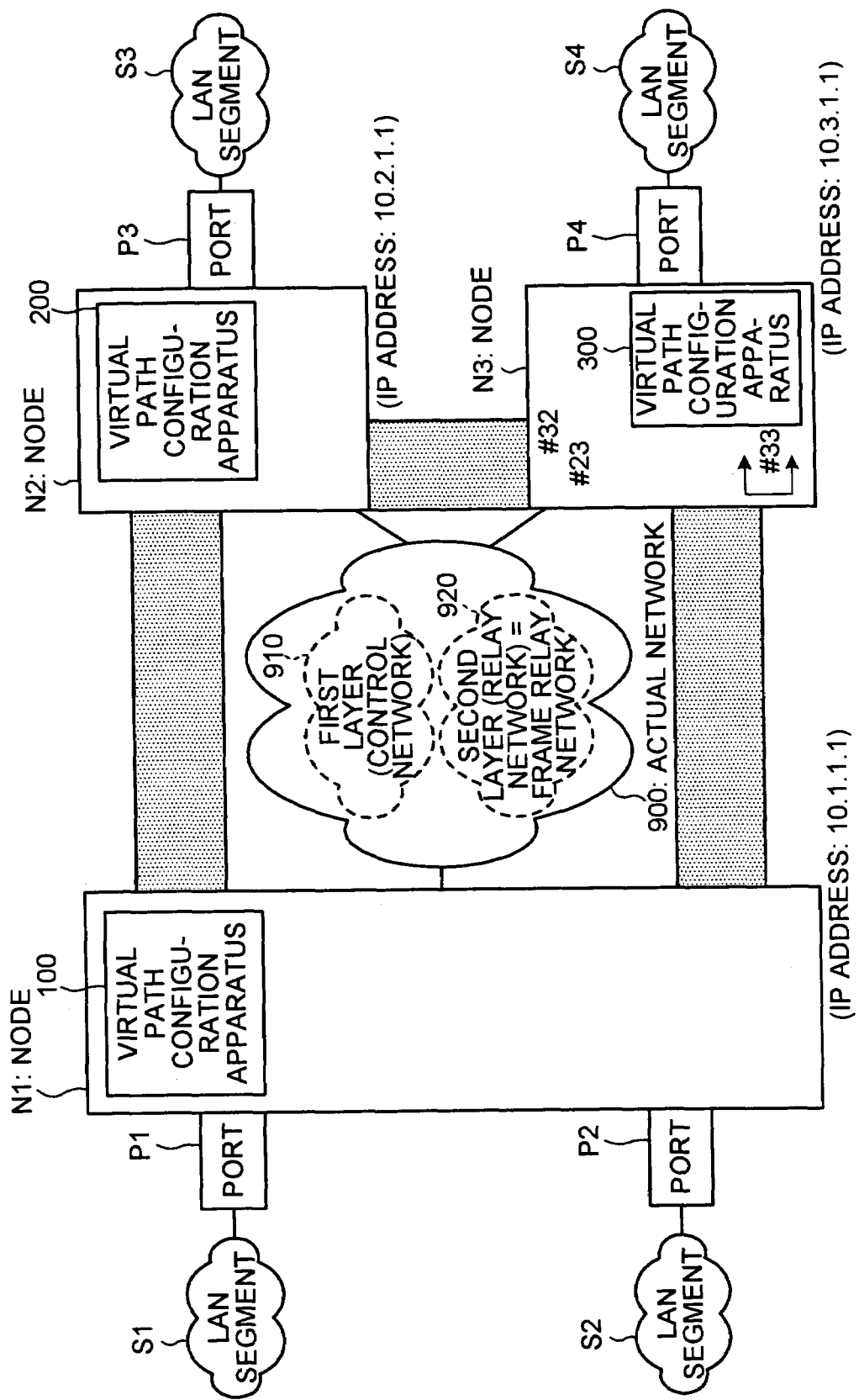
FIG. 26 is to explain a sixth modification of the embodiment.

The embodiment shown in FIG. 1 explains the configuration example where the control network 400 and the relay network 410 are provided between the nodes (virtual path configuration apparatuses). Like a sixth modification shown in FIG. 26, however, an actual network 900 may be provided, a first layer 910 may be used as the control network, and a second layer 920 may be used as the relay network (=Frame Relay network).

Figure 27:
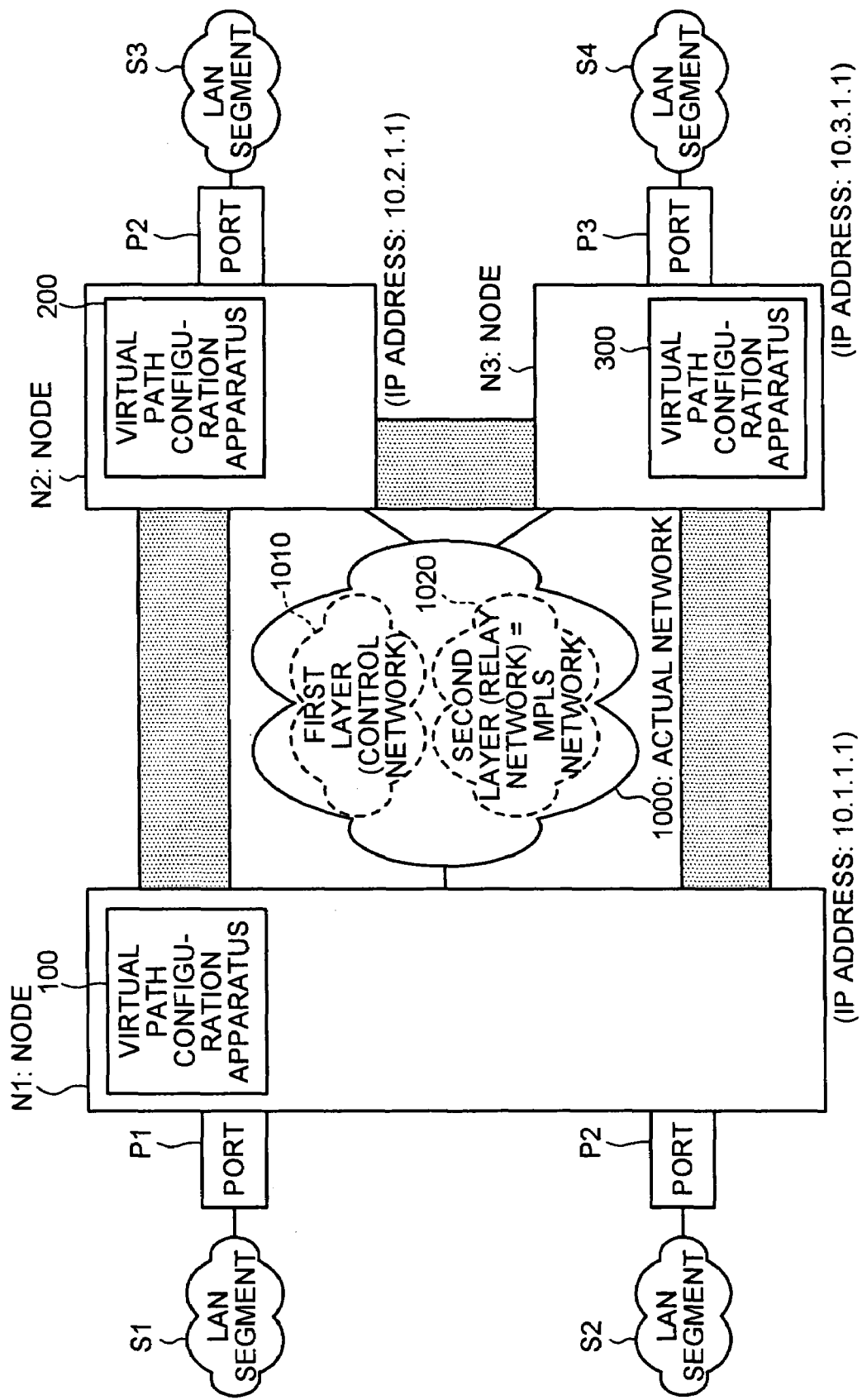
FIG. 27 is to explain a seventh modification of the embodiment.

The embodiment shown in FIG. 1 explains the configuration example where the control network 400 and the relay network 410 are provided between the nodes (virtual path configuration apparatuses). Like a seventh modification shown in FIG. 27, however, an actual network 1000 may be provided, a first layer 1010 may be used as the control network, and a second layer 1020 may be used as the relay network (=MPLS network).

Figure 28:
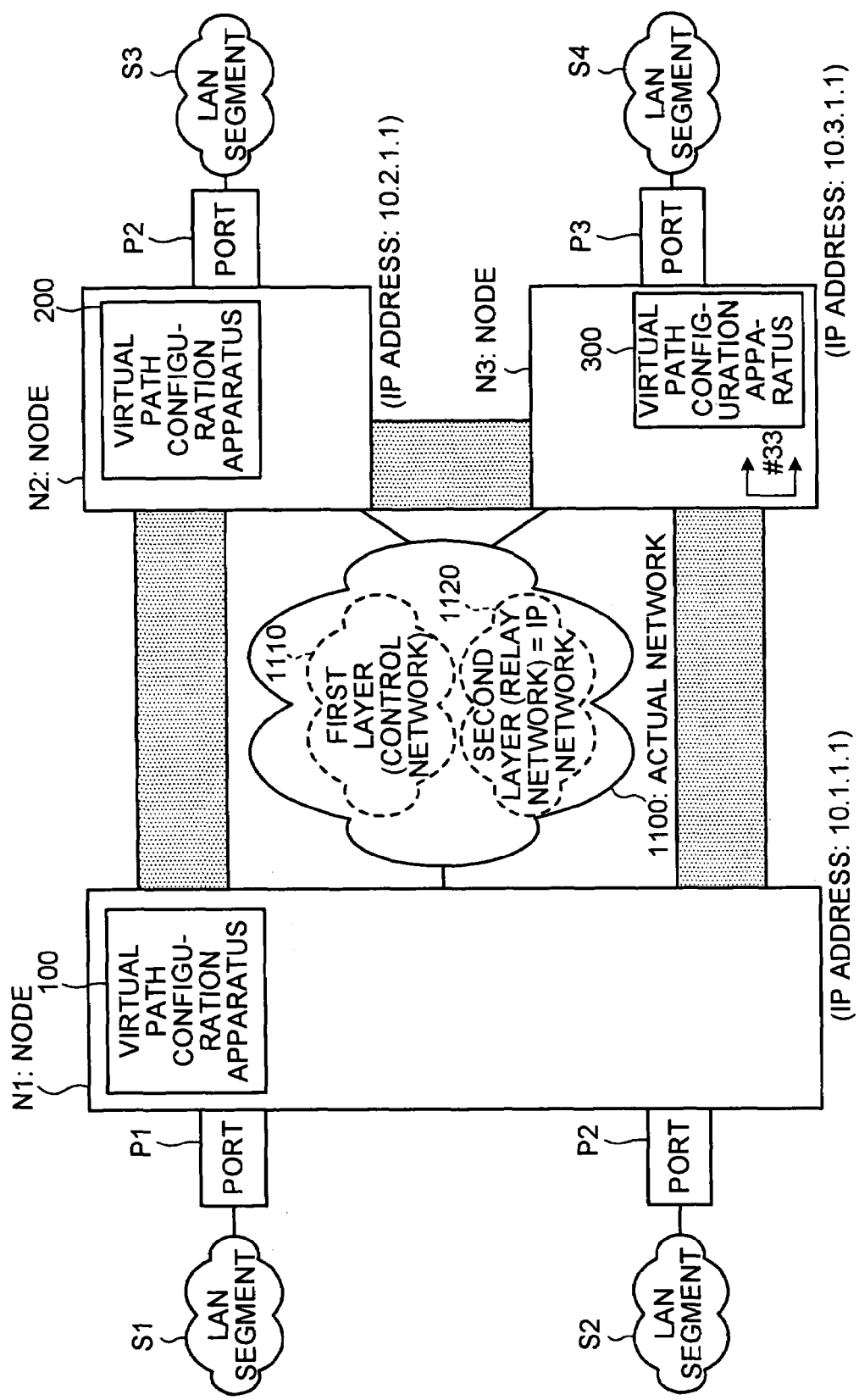
FIG. 28 is to explain an eighth modification of the embodiment.

The embodiment shown in FIG. 1 explains the configuration example where the control network 400 and the relay network 410 are provided between the nodes (virtual path configuration apparatuses). Like an eighth modification shown in FIG. 28, however, an actual network 1100 may be provided, a first layer 1110 may be used as the control network, and a second layer 1120 may be used as the relay network (=IP network).

Figure 29:
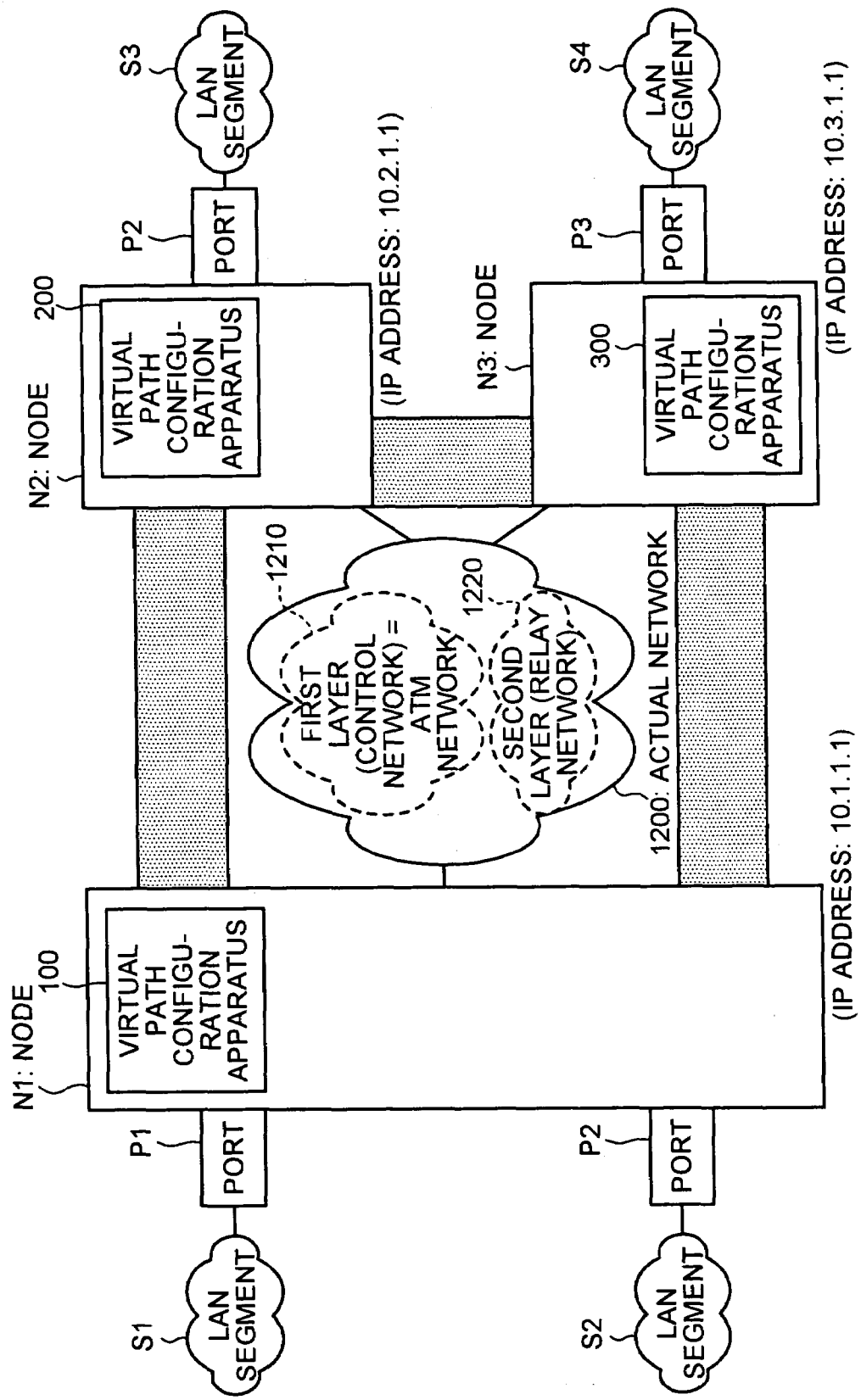
FIG. 29 is to explain a ninth modification of the embodiment.

The embodiment shown in FIG. 1 explains the configuration example where the control network 400 and the relay network 410 are provided between the nodes (virtual path configuration apparatuses). Like a ninth modification shown in FIG. 29, however, an actual network 1200 may be provided, a first layer 1210 may be used as the control network (=ATM network), and a second layer 1220 may be used as the relay network.

Figure 30:
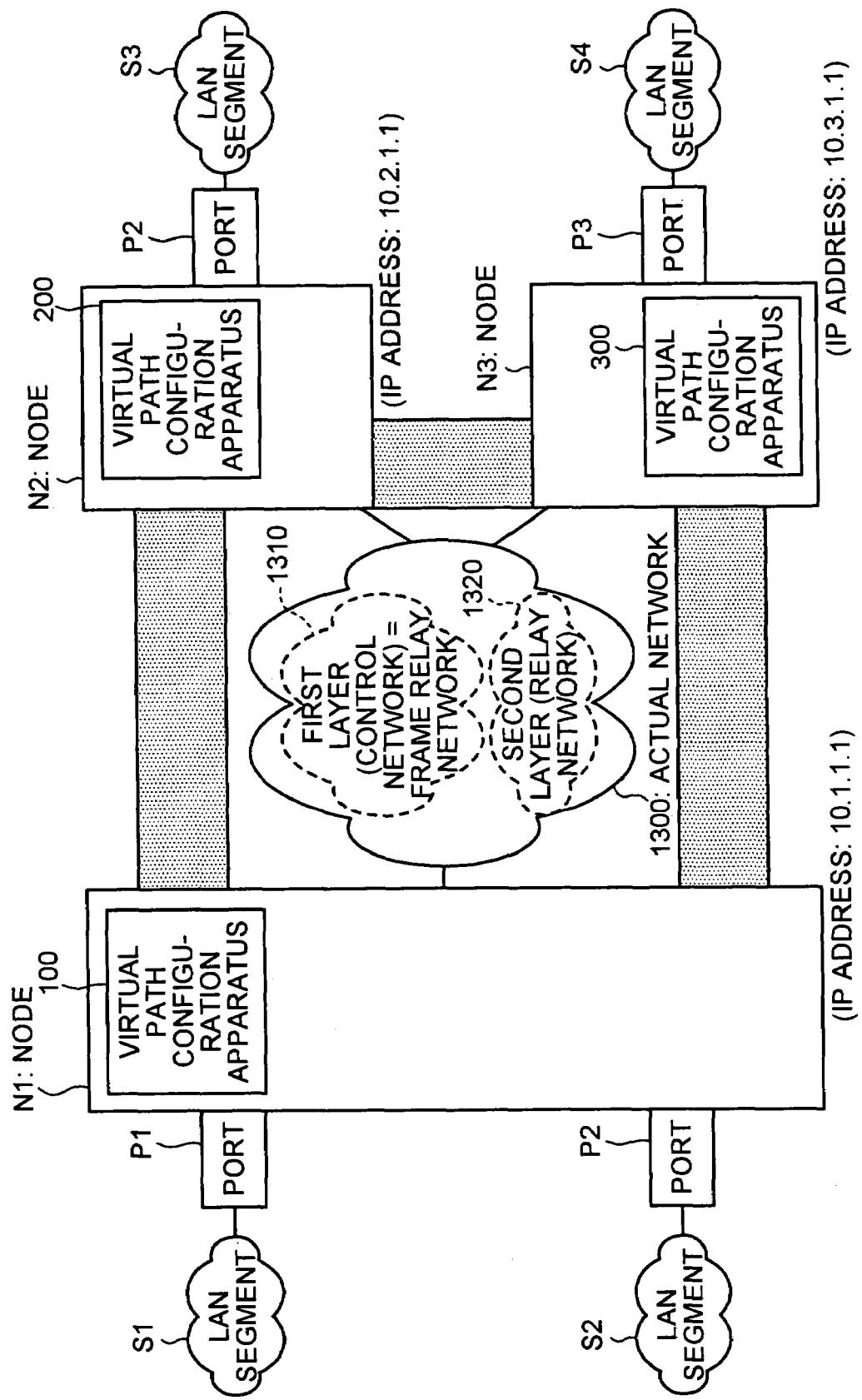
FIG. 30 is to explain a tenth modification of the embodiment.

The embodiment shown in FIG. 1 explains the configuration example where the control network 400 and the relay network 410 are provided between the nodes (virtual path configuration apparatuses). Like tenth modification shown in FIG. 30, however, an actual network 1300 may be provided, a first layer 1310 may be used as the control network (=Frame Relay network), and a second layer 1320 may be used as the relay network.

Figure 31:
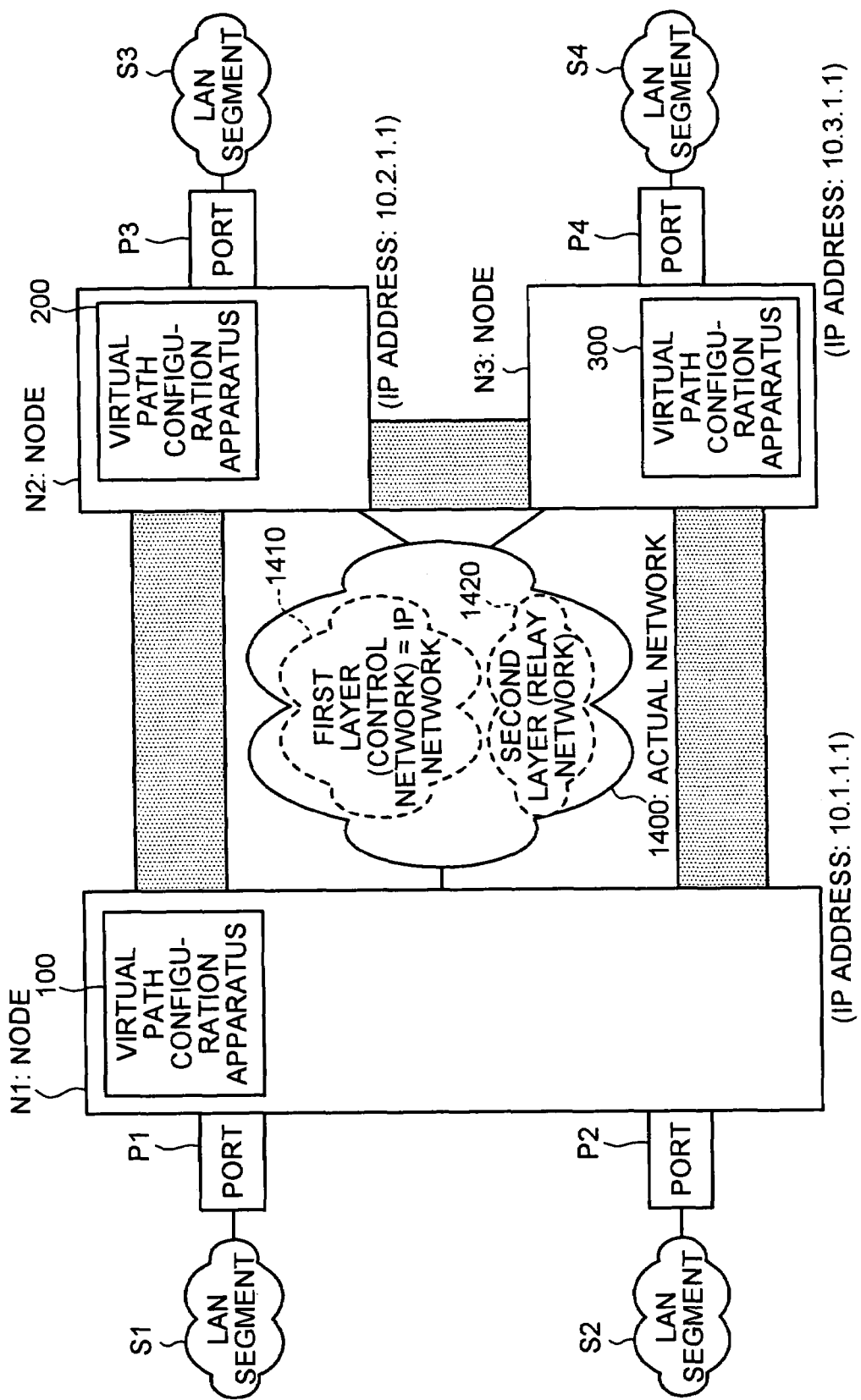
FIG. 31 is to explain an eleventh modification of the embodiment.

The embodiment shown in FIG. 1 explains the configuration example where the control network 400 and the relay network 410 are provided between the nodes (virtual path configuration apparatuses). Like an eleventh modification shown in FIG. 31, however, an actual network 1400 may be provided, a first layer 1410 may be used as the control network (=IP network), and a second layer 1420 may be used as the relay network.

Figure 32:
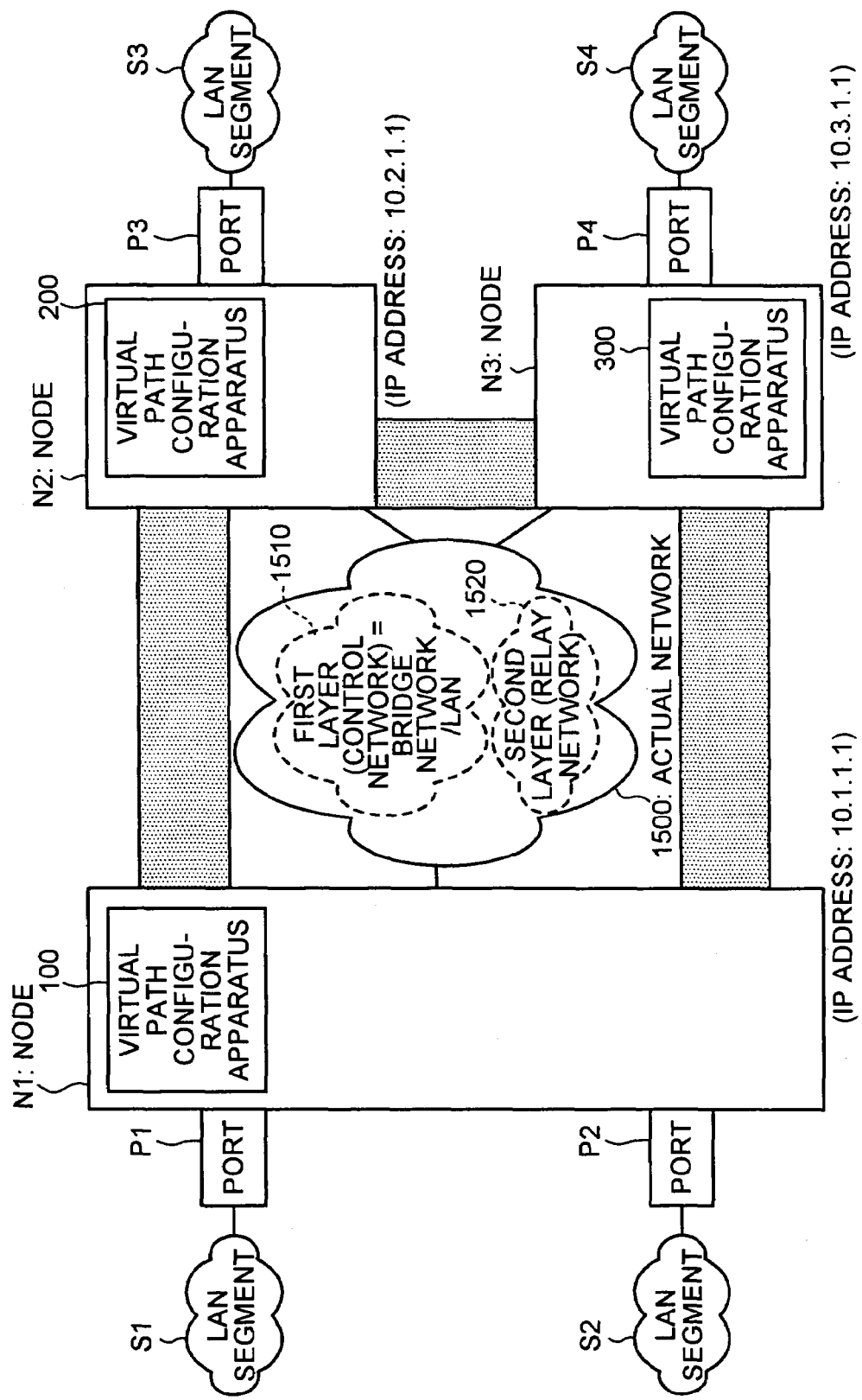
FIG. 32 is to explain a twelfth modification of the embodiment.

The embodiment shown in FIG. 1 explains the configuration example where the control network 400 and the relay network 410 are provided between the nodes (virtual path configuration apparatuses). Like a twelfth modification shown in FIG. 32, however, an actual network 900 may be provided, a first layer 910 may be used as the control network (=bridge network), and a second layer 920 may be used as the relay network.

According to the embodiment, the configuration information provided in one virtual path configuration apparatus (for example, the virtual path configuration apparatus 100) is shared between all the virtual path configuration apparatuses, so that the virtual paths are configured. Accordingly, a load on the network administrator required for configuring the virtual paths can be reduced, and thus convenience can be improved.

According to the embodiment, as explained at SB5 (see FIG. 12), the load on the network administrator required for re-configuring the virtual paths due to the addition of configuration information can be reduced, and thus the convenience can be improved.

According to the embodiment, as explained at SB5 (see FIG. 12), the load on the network administrator required for re-configuring the virtual paths due to the deletion of configuration information can be reduced, and thus the convenience can be improved.

According to the embodiment, since states of another virtual path configuration apparatuses are monitored, the network administrator can quickly cope with the occurrence of failure or the like. Further, according to the embodiment, the configuration information list including the components of a virtual private network is exchanged between all the nodes configuring the virtual private network. Accordingly, when failure occurs in a necessary communication path between the components, the location of failure can be specified in any nodes.

The embodiment of the present invention is explained with reference to the drawings, but the concrete configuration example is not limited to the embodiment, and all changes in design are intended to be embraced in the present invention without departing from the scope of the present invention.

Figure 33:
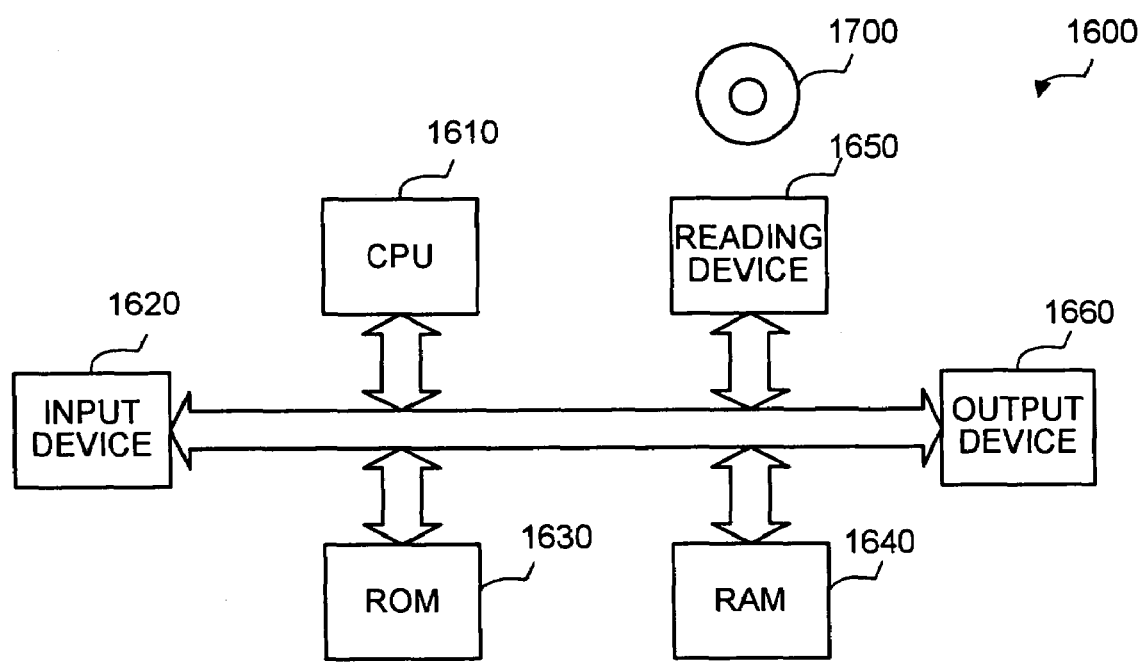
FIG. 33 is to explain a thirteenth modification of the embodiment.

For example, in the embodiment, a program for realizing the functions of the virtual path configuration apparatuses 100, 200, and 300 shown in FIG. 1 may be recorded in a recording medium 1700 readable by a computer shown in FIG. 33, the program recorded in the recording medium 1700 may be read into the computer 1600 shown in the drawing and executed so as to realize the functions.

The computer 1600 shown in the drawing includes a central processing unit (CPU) 1610 which executes the program, an input device 1620 such as a keyboard and or a mouse, a read only memory (ROM) 1630 which stores various data, a random access memory (RAM) 1640 which stores an operation parameter and the like, a reading device 1650 which reads the program from the recording medium 1700, and an output device 1660 such as a display or a printer.

The CPU 1610 reads the program recorded in the recording medium 1700 via the reading device 1650, and executes the program so as to realize the function. The recording medium 1700 includes an optical disc, a flexible disc, a hard disc, and the like.

According to the present invention, the configuration information set in one virtual path configuration apparatus is shared between all virtual path configuration apparatuses, so that the virtual paths are configured. Accordingly, the load on the network administrator required for configuring the virtual paths can be reduced, and thus the convenience can be improved.

Furthermore, the load on the network administrator required for reconfiguring the virtual paths due to addition of configuration information can be reduced, and thus the convenience can be improved.

Moreover, the load on the network administrator required for reconfiguring the virtual paths due to deletion of configuration information can be reduced, and thus the convenience can be improved.

Since states of other virtual path configuration apparatuses are monitored, the network administrator can quickly cope with the occurrence of failure or the like. Further, according to the present invention, the configuration information list including the components of the virtual private network is exchanged between all the nodes composing the virtual private network. Accordingly, when the failure occurs in a necessary communication path between the components, the location of failure in any nodes can be specified.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A virtual path configuration apparatus included in each of nodes in a virtual private network to interconnect a plurality of user networks via virtual paths and that is arranged in each node, comprising:
    a configuration information setting unit that includes an input device for receiving configuration information over a control network for inputting setting commands and information on ports accommodating user networks and nodes providing the ports, and that sets configuration information that is information about sets of the ports and the nodes;

a configuration information sharing unit that shares the configuration information with the other one of the virtual path configuration apparatuses included in the other one of the nodes, by transmitting the configuration information being set by the configuration information setting unit to the other virtual path configuration apparatuses over the control network, or receiving the configuration information from the other virtual path configuration apparatuses over the control network, wherein the configuration information sharing unit also includes a synchronization determination section that receives a response message over the control network to confirm each entry is synchronized with each of the other nodes; and a virtual path configuration unit that configures the virtual paths between any combination of two of shared ports over a relay network to relay packets between user networks based on the shared configuration information.

2. The virtual path configuration apparatus according to claim 1, wherein the configuration information setting unit sets additional configuration information that is information that is to be added to the configuration information set previously, the configuration information sharing unit transmits the additional configuration information to the other virtual path configuration apparatuses and receives additional configuration information from the other virtual path configuration apparatuses, and the virtual path configuration unit reconfigures the virtual path based on configuration information obtained by adding the additional configuration information to the configuration information set previously.

3. The virtual path configuration apparatus according to claim 1, wherein the configuration information setting unit sets deletion configuration information that is information that is to be deleted from the configuration information set previously, the configuration information sharing unit transmits the deletion configuration information to the other virtual path configuration apparatuses and receives deletion configuration information from the other virtual path configuration apparatuses, and the virtual path configuration unit reconfigures the virtual path based on configuration information obtained by deleting the deletion configuration information from the configuration information set previously.

4. The virtual path configuration apparatus according to claim 1, wherein the configuration information sharing unit monitors states of the other virtual path configuration apparatus.

5. The virtual path configuration apparatus according to claim 1, wherein the configuration information includes information about nodes to which the user networks attach, and the virtual path configuration unit configures virtual paths between the nodes in a full mesh manner.

6. The virtual path configuration apparatus according to claim 1, wherein the configuration information includes information about ports to which the user networks attach, and the virtual path configuration unit configures virtual paths between the ports in a full mesh manner.

7. A virtual path configuration method executed on a virtual path configuration apparatus included in each of nodes in a virtual private network for interconnecting a plurality of user networks via virtual paths and that is arranged in each node, comprising:

inputting setting commands and information on ports accommodating user networks and nodes providing the ports based on configuration information received over a control network;

setting the configuration information that is information about sets of the ports and the nodes;

transmitting the configuration information to or receiving the configuration information from other virtual path configuration apparatuses included in other one of the nodes over the control network;

sharing the configuration information with the other one of the virtual path configuration apparatuses included in the other one of the nodes over the control network, the configuration information being set by the configuration information setting unit, and determining synchronization by receiving a response message over the control network to confirm each entry is synchronized with each of the other nodes; and configuring virtual paths between any combination of two of shared ports over a relay network to relay packets between user networks based on the shared configuration information.

8. The virtual path configuration method according to claim 7, wherein the setting includes setting additional configuration information that is information that is to be added to the configuration information set previously, the sharing includes transmitting the additional configuration information to the other virtual path configuration apparatuses or receiving additional configuration information from the other virtual path configuration apparatuses, and the configuring includes reconfiguring the virtual path based on configuration information obtained by adding the additional configuration information to the configuration information set previously.

9. The virtual path configuration method according to claim 7, wherein the setting includes setting deletion configuration information that is information that is to be deleted from the configuration information set previously, the sharing includes transmitting the deletion configuration information to the other virtual path configuration apparatuses or receiving deletion configuration information from the other virtual path configuration apparatuses, and the configuring includes reconfiguring the virtual path based on configuration information obtained by deleting the deletion configuration information from the configuration information set previously.

10. The virtual path configuration method according to claim 7, wherein the sharing includes monitoring states of the other virtual path configuration apparatus.

11. The virtual path configuration method according to claim 7, wherein the configuration information includes information about nodes to which the user networks attach, and the virtual path configuration unit configures virtual paths between the nodes in a full mesh manner.

12. The virtual path configuration method according to claim 7, wherein the configuration information includes information about ports to which the user networks attach, and the virtual path configuration unit configures virtual paths between the ports in a full mesh manner.

13. A computer readable recording medium storing instructions, which when executed by a computer in a virtual path configuration apparatus included in each of nodes in a virtual private network for interconnecting a plurality of user networks via virtual paths and that is arranged in each node, causes the computer to perform operations, comprising:

inputting setting commands and information on ports accommodating user networks and nodes providing the ports based on configuration information received over a control network;

setting the configuration information that is information about sets of the ports and the nodes;

transmitting the configuration information to or receiving the configuration information from other virtual path configuration apparatuses included in other one of the nodes over the control network;

sharing the configuration information with the other one of the virtual path configuration apparatuses included in the other one of the nodes over the control network, the configuration information being set by the configuration information setting unit, and determining synchronization by receiving a response message over the control network to confirm each entry is synchronized with each of the other nodes; and configuring virtual paths between any combination of two of shared ports over a relay network to relay packets between user networks based on the shared configuration information.

14. The computer readable recording medium according to claim 13, wherein the setting includes setting additional configuration information that is information that is to be added to the configuration information set previously, the sharing includes transmitting the additional configuration information to the other virtual path configuration apparatuses or receiving additional configuration information from the other virtual path configuration apparatuses, and the configuring includes reconfiguring the virtual path based on configuration information obtained by adding the additional configuration information to the configuration information set previously.

15. The computer readable recording medium according to claim 13, wherein the setting includes setting deletion configuration information that is information that is to be deleted from the configuration information set previously, the sharing includes transmitting the deletion configuration information to the other virtual path configuration apparatuses or receiving deletion configuration information from the other virtual path configuration apparatuses, and the configuring includes reconfiguring the virtual path based on configuration information obtained by deleting the deletion configuration information from the configuration information set previously.

16. The computer readable recording medium according to claim 13, wherein the sharing includes monitoring states of the other virtual path configuration apparatus.

17. The computer readable recording medium according to claim 13, wherein the configuration information includes information about nodes to which the user networks attach, and the virtual path configuration unit configures virtual paths between the nodes in a full mesh manner.

18. The computer readable recording medium according to claim 13, wherein the configuration information includes information about ports to which the user networks attach, and the virtual path configuration unit configures virtual paths between the ports in a full mesh manner.

* * * * *